United States Patent
Gyoda

(10) Patent No.: US 11,243,384 B2
(45) Date of Patent: Feb. 8, 2022

(54) ZOOM LENS AND IMAGE PICKUP APPARATUS INCLUDING THE SAME

(71) Applicant: CANON KABUSHIKI KAISHA, Tokyo (JP)

(72) Inventor: Yuichi Gyoda, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 320 days.

(21) Appl. No.: 16/583,700

(22) Filed: Sep. 26, 2019

(65) Prior Publication Data
US 2020/0110251 A1 Apr. 9, 2020

(30) Foreign Application Priority Data
Oct. 4, 2018 (JP) .............................. JP2018-188857

(51) Int. Cl.
*G02B 15/177* (2006.01)
*G02B 15/14* (2006.01)

(52) U.S. Cl.
CPC ....... *G02B 15/1435* (2019.08); *G02B 15/177* (2013.01)

(58) Field of Classification Search
CPC ... G02B 15/1435; G02B 15/14; G02B 15/177
USPC .................................................. 359/689, 676
See application file for complete search history.

(56) References Cited

U.S. PATENT DOCUMENTS

| | | |
|---|---|---|
| 9,897,788 B2 | 2/2018 | Gyoda |
| 10,025,075 B2 | 7/2018 | Gyoda |
| 10,120,172 B2 | 11/2018 | Gyoda |
| 10,215,972 B2 | 2/2019 | Gyoda et al. |
| 2006/0061872 A1* | 3/2006 | Yamasaki ...... G02B 15/145531 359/680 |
| 2019/0094490 A1 | 3/2019 | Gyoda |

FOREIGN PATENT DOCUMENTS

JP        2015206976 A        11/2015

* cited by examiner

*Primary Examiner* — James R Greece
(74) *Attorney, Agent, or Firm* — Carter, DeLuca & Farrell LLP

(57) ABSTRACT

Provided is a zoom lens including a plurality of lens units, in which an interval between each pair of adjacent lens units is changed for zooming. The plurality of lens units consist of, in order from an object side to an image side: a first lens unit having a negative refractive power; a second lens unit having a positive refractive power; and a rear lens group including at least two lens units. The first lens unit and the second lens unit are configured to move during zooming. The first lens unit includes, in order from the object side to the image side, a negative lens G1, a negative lens G2, and a negative lens G3.

17 Claims, 15 Drawing Sheets

WIDE ANGLE END

TELEPHOTO END

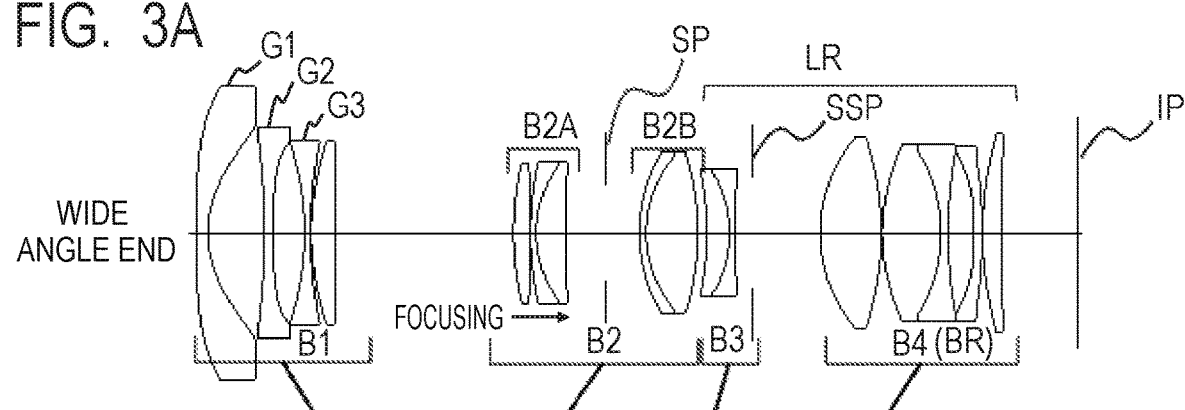
FIG. 3A WIDE ANGLE END
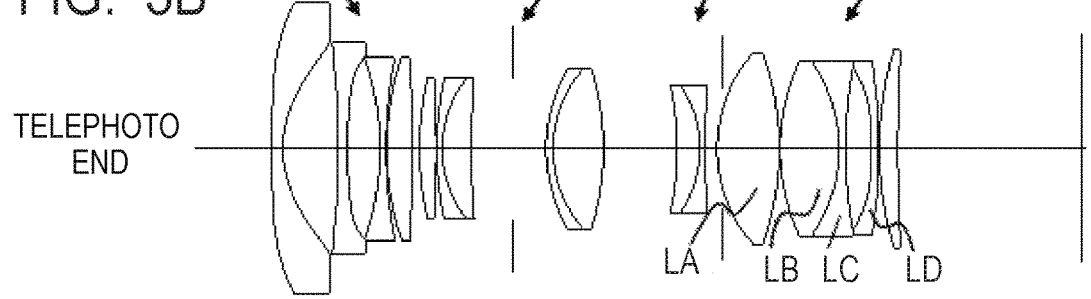
FIG. 3B TELEPHOTO END

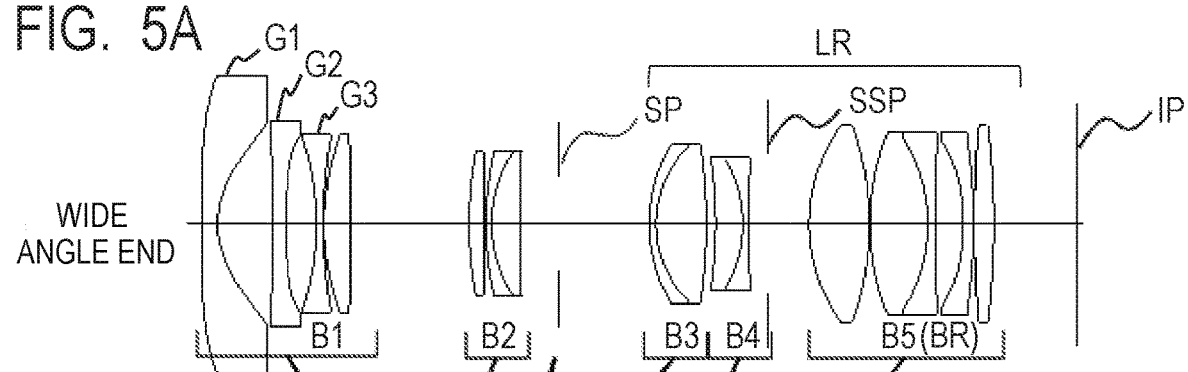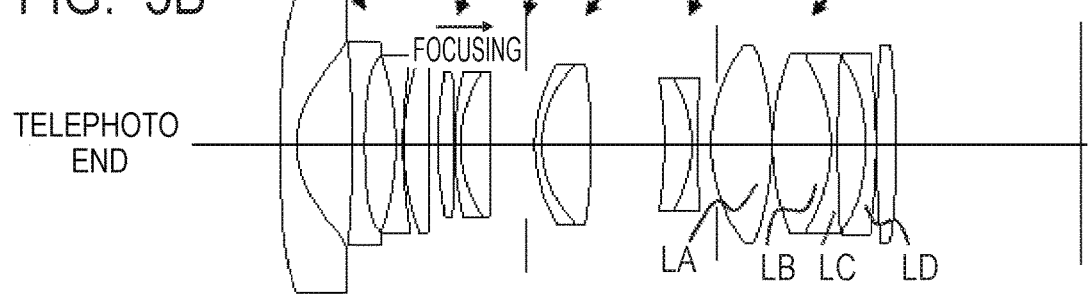

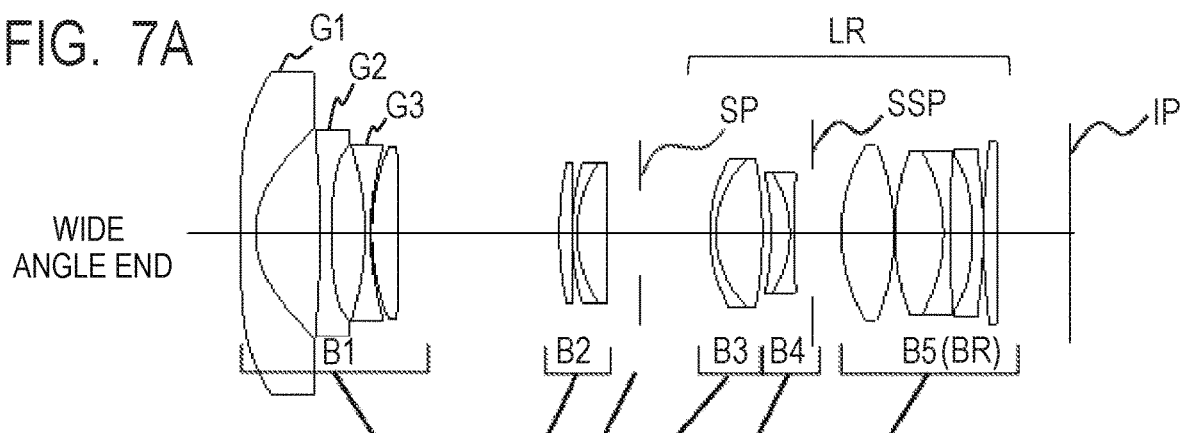
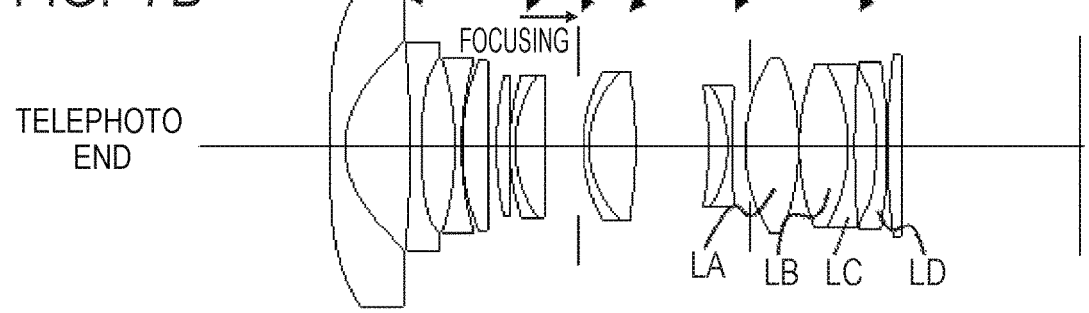

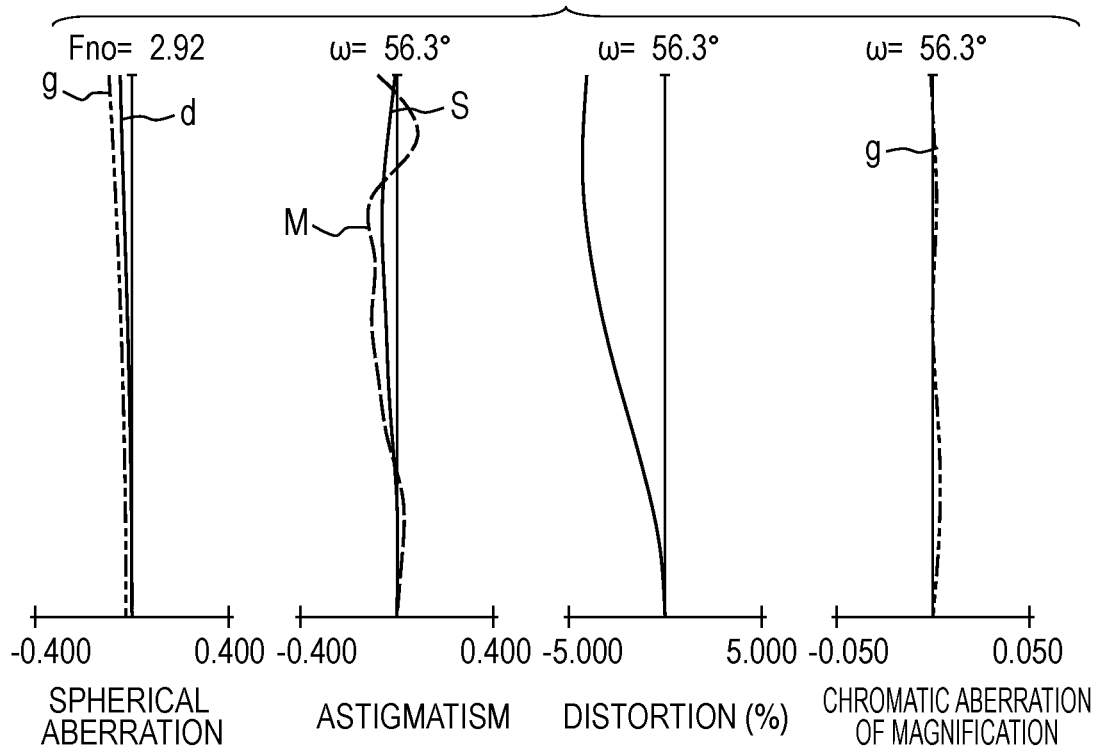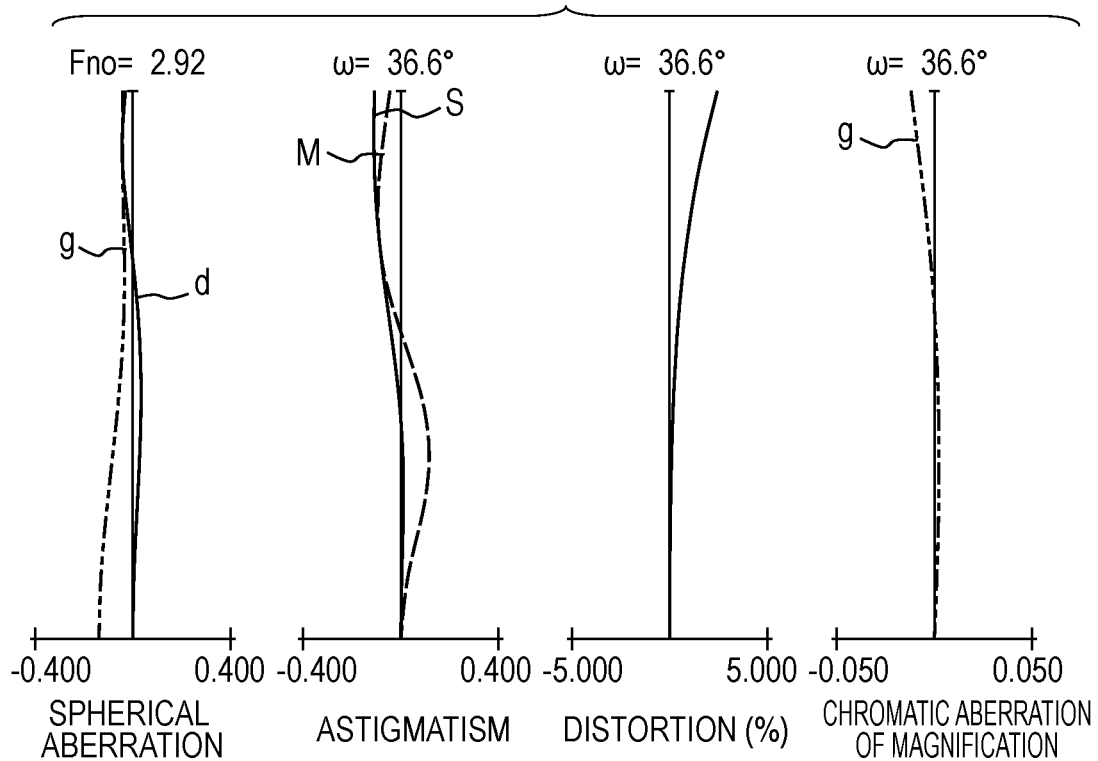

ZOOM LENS AND IMAGE PICKUP APPARATUS INCLUDING THE SAME

BACKGROUND OF THE INVENTION

Field of the Invention

The present invention relates to a zoom lens, which is suited to be used as an image pickup optical system for an image pickup apparatus such as a digital still camera, a video camera, a TV camera, a monitoring camera, and a mirrorless camera.

Description of the Related Art

In recent years, an image pickup optical system used in an image pickup apparatus has been required to be a zoom lens having high performance (high resolution) over an entire object distance, in addition to having a small size of the entire system, a short total lens length, and a wide angle of view. Among such zoom lenses, as a zoom lens having a wide angle of view, specifically, having an image pickup half angle of view of about 40 degrees, there has been known a negative-lead type zoom lens in which a lens unit having a negative refractive power precedes other lens units.

In Japanese Patent Application Laid-Open No. 2015-206976, there is disclosed a four-unit zoom lens consisting of, in order from an object side to an image side, lens units having negative, positive, negative, and positive refractive powers, respectively, in which an interval between each pair of adjacent lens units is changed for zooming. In addition, in Japanese Patent Application Laid-Open No. 2015-206976, there is disclosed a five-unit zoom lens consisting of, in order from an object side to an image side, a first lens unit to a fifth lens unit having negative, positive, positive, negative, and positive refractive powers, respectively, in which the lens units are configured to move for zooming.

In the negative-lead type zoom lens, it is relatively easy to increase the angle of view while downsizing the zoom lens. However, in a lens configuration of the negative-lead type zoom lens, lenses are arranged to be asymmetric with respect to an aperture stop. Thus, when the zoom lens is to be downsized and the angle of view is to be increased, a large amount of various aberrations including distortion is generated, and it becomes difficult to correct those various aberrations. In particular, in a zoom lens having a wide angle range including an image pickup angle of view of more than 100 degrees, a large amount of various aberrations is generated.

In the negative-lead type zoom lens, in order to obtain high optical performance over the entire zoom range while downsizing the entire system and securing a wide angle of view, it is important to appropriately set each lens unit included in the zoom lens. It is particularly important to appropriately set lens configurations on an image side of a lens unit including an aperture stop. Unless the lens configurations of the lens units are appropriate, a zoom lens is upsized when a wide angle of view is to be achieved, and further, variations of various aberrations accompanying zooming are increased, with the result that it becomes greatly difficult to obtain high optical performance over the entire zoom range and over the entire image plane.

SUMMARY OF THE INVENTION

It is an object of the present invention to provide a zoom lens that is small as the entire system and has a wide angle of view and good optical performance over the entire zoom range, and an image pickup apparatus including the same.

According to at least one embodiment of the present invention, there is provided a zoom lens including, in order from an object side to an image side: a first lens unit having a negative refractive power; a second lens unit having a positive refractive power; and a rear lens group including at least two lens units, at least the first lens unit and the second lens unit being configured to move for zooming to change an interval between each pair of adjacent lens units, the first lens unit including, in order from the object side to the image side, a first negative lens, a second negative lens, and a third negative lens, at least one of a lens surface on the object side or a lens surface on the image side of the first negative lens having an aspherical shape, wherein conditional expressions $0.20 < BFw/|f1| < 1.00$, and $0.50 < f\_BR/ft < 2.00$ are satisfied where f1 represents a focal length of the first lens unit, f_BR represents a focal length of a lens unit BR arranged closest to the image side in the rear lens group, "ft" represents a focal length of the zoom lens at a telephoto end, and BFw represents a back focus of the zoom lens at a wide angle end.

Further features of the present invention will become apparent from the following description of exemplary embodiments with reference to the attached drawings.

BRIEF DESCRIPTION OF THE DRAWINGS

FIG. 3A is a lens cross-sectional view of a zoom lens according to Embodiment 2 of the present invention when the zoom lens is focused at infinity at a wide angle end.

FIG. 3B is a lens cross-sectional view of a zoom lens according to Embodiment 2 of the present invention when the zoom lens is focused at infinity at a telephoto end.

FIG. 5A is a lens cross-sectional view of a zoom lens according to Embodiment 3 of the present invention when the zoom lens is focused at infinity at a wide angle end.

FIG. 5B is a lens cross-sectional view of a zoom lens according to Embodiment 3 of the present invention when the zoom lens is focused at infinity at a telephoto end.

FIG. 7A is a lens cross-sectional view of a zoom lens according to Embodiment 4 of the present invention when the zoom lens is focused at infinity at a wide angle end.

FIG. 7B is a lens cross-sectional view of a zoom lens according to Embodiment 4 of the present invention when the zoom lens is focused at infinity at a telephoto end.

FIG. 10A is aberration diagrams of the zoom lens according to Embodiment 5 when the zoom lens is focused at infinity at the wide angle end.

FIG. 10B is aberration diagrams of the zoom lens according to Embodiment 5 when the zoom lens is focused at infinity at the telephoto end.

DESCRIPTION OF THE EMBODIMENTS

Now, exemplary embodiments of the present invention are described with reference to the attached drawings.

A zoom lens according to at least one embodiment of the present invention includes a plurality of lens units, in which an interval between each pair of adjacent lens units is changed during zooming. The plurality of lens units consist of, in order from an object side to an image side: a first lens unit having a negative refractive power; a second lens unit having a positive refractive power; and a rear lens group including at least two lens units. The first lens unit and the second lens unit are configured to move during zooming. The first lens unit includes, in order from the object side to the image side, a negative lens G1 (first negative lens), a negative lens G2 (second negative lens), and a negative lens G3 (third negative lens). At least one of a lens surface on the object side or a lens surface on the image side of the negative lens G1 has an aspherical shape.

Figure 1A:
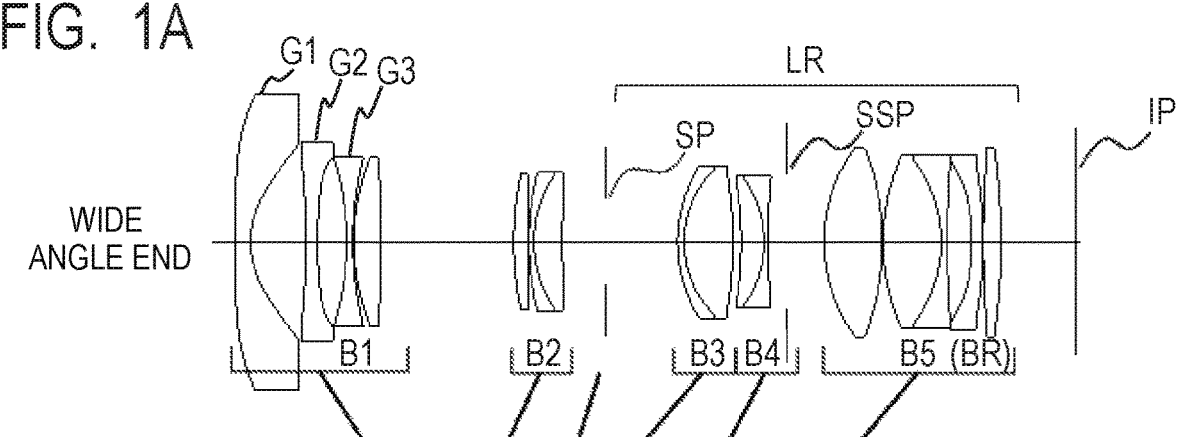
FIG. 1A is a lens cross-sectional view of a zoom lens according to Embodiment 1 of the present invention when the zoom lens is focused at infinity at a wide angle end.
Figure 1B:
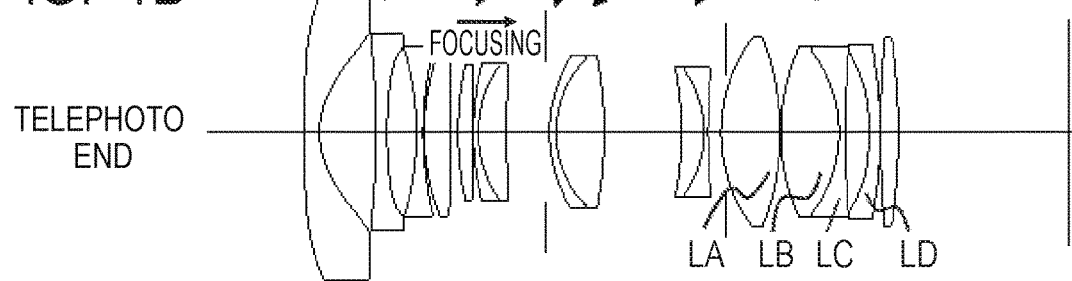
FIG. 1B is a lens cross-sectional view of a zoom lens according to Embodiment 1 of the present invention when the zoom lens is focused at infinity at a telephoto end.
Figure 2A:
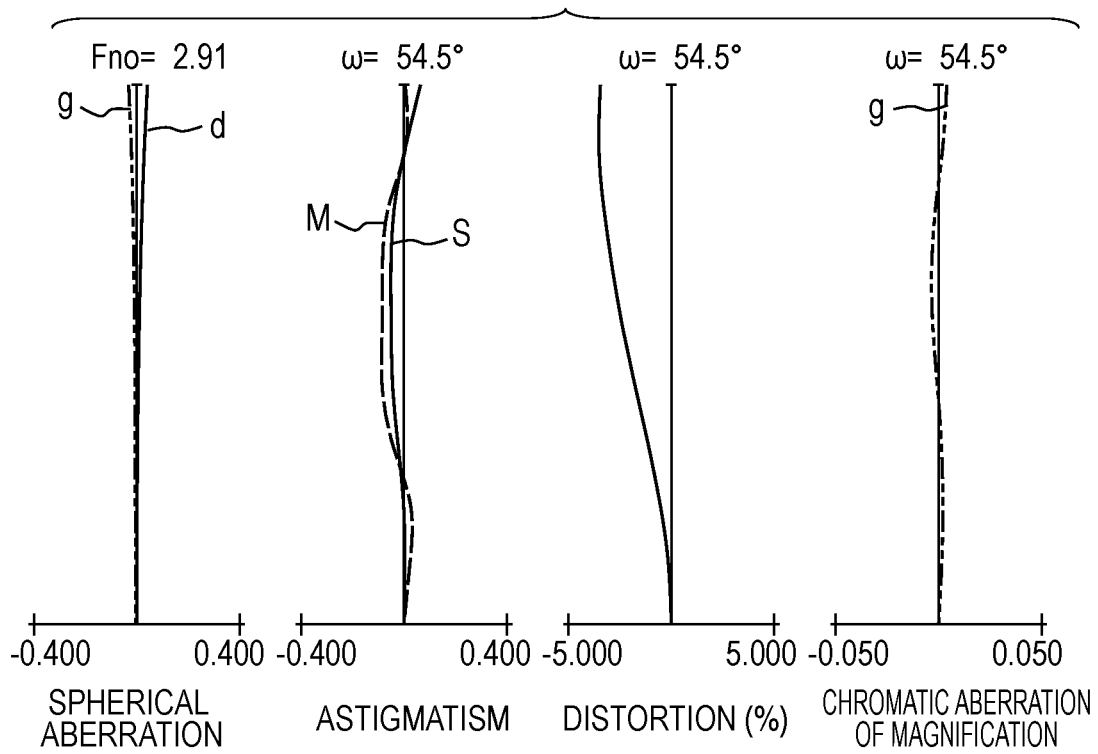
FIG. 2A is aberration diagrams of the zoom lens according to Embodiment 1 when the zoom lens is focused at infinity at the wide angle end.
Figure 2B:
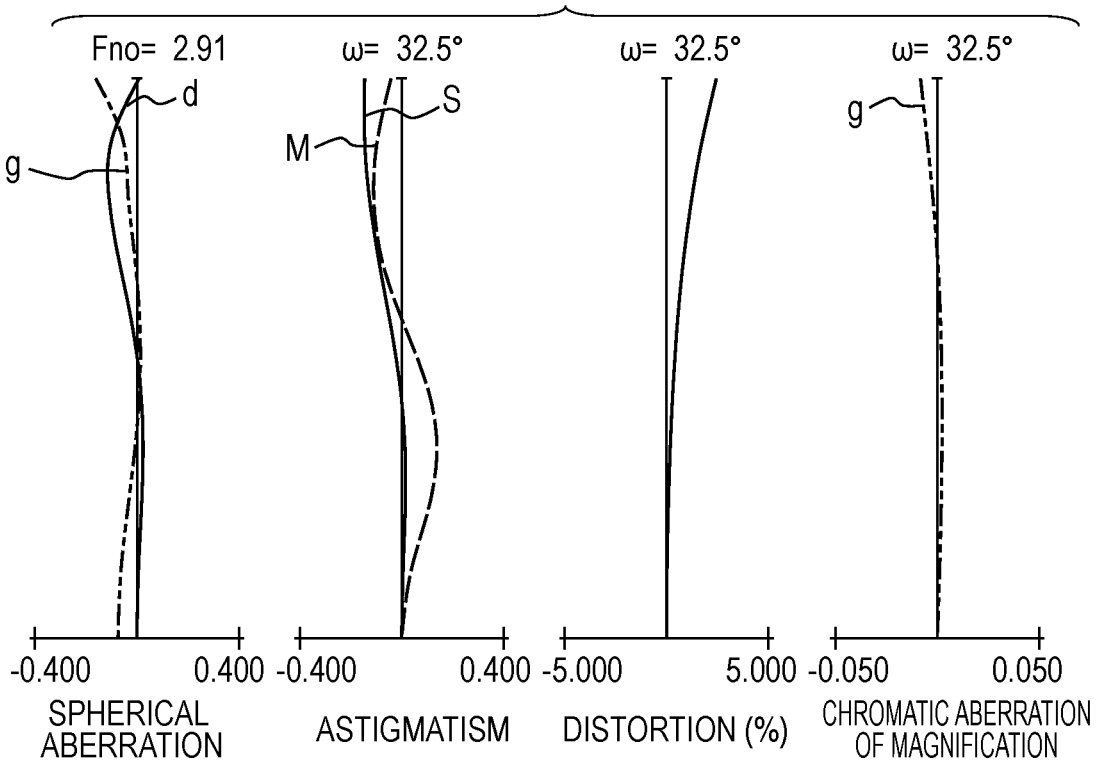
FIG. 2B is aberration diagrams of the zoom lens according to Embodiment 1 when the zoom lens is focused at infinity at the telephoto end.

FIG. 1A and FIG. 1B are lens cross-sectional views of a zoom lens according to Embodiment 1 of the present invention when the zoom lens is focused at a wide angle end (short focal length end) and at a telephoto end (long focal length end), respectively. FIG. 2A and FIG. 2B are aberration diagrams of the zoom lens according to Embodiment 1 when the zoom lens is focused at infinity at the wide angle end and at the telephoto end, respectively. Embodiment 1 relates to a zoom lens having a zoom ratio of 2.20, an aperture ratio (F-number) of 2.91, and an image pickup half angle of view of from about 54.47° to about 32.51°. In all of the following aberration diagrams, the zoom lens is focused at infinity.

Figure 4A:
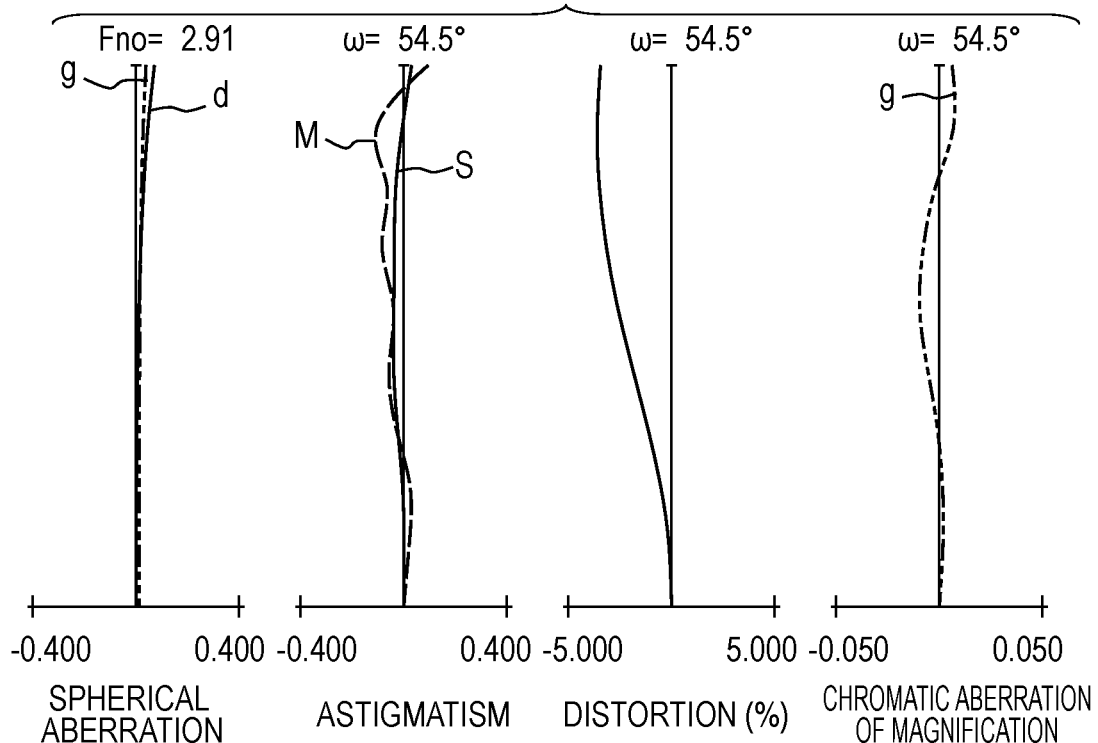
FIG. 4A is aberration diagrams of the zoom lens according to Embodiment 2 when the zoom lens is focused at infinity at the wide angle end.
Figure 4B:
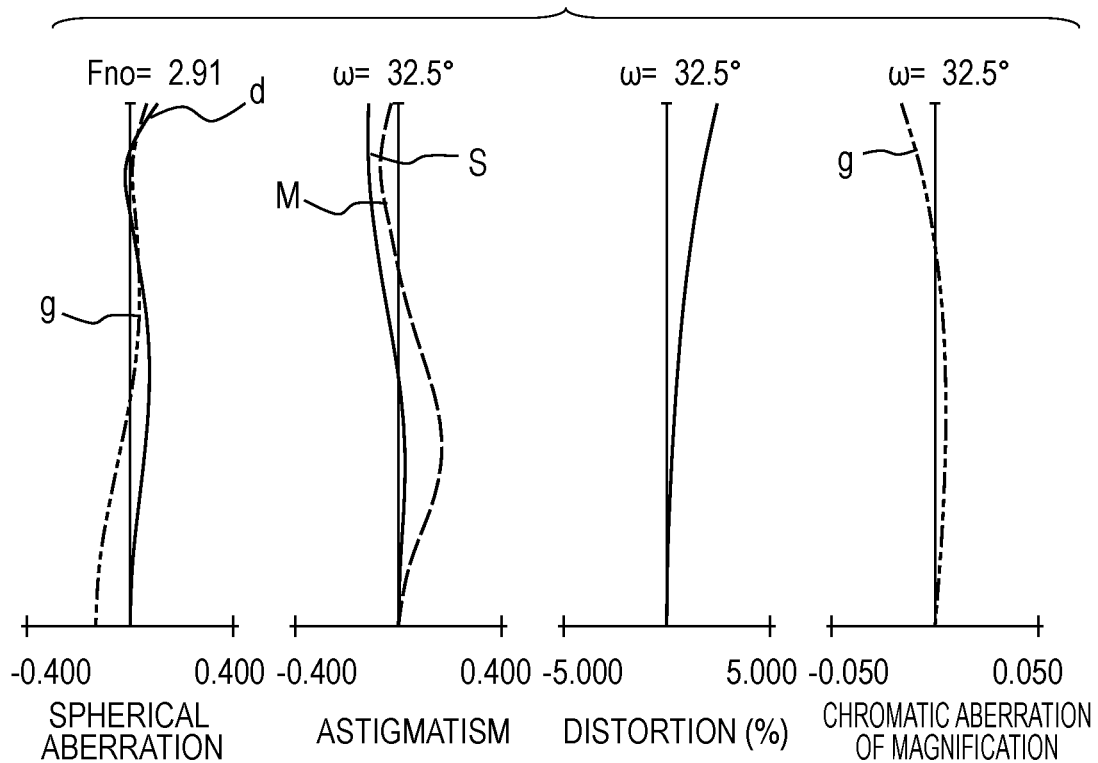
FIG. 4B is aberration diagrams of the zoom lens according to Embodiment 2 when the zoom lens is focused at infinity at the telephoto end.

FIG. 3A and FIG. 3B are lens cross-sectional views of a zoom lens according to Embodiment 2 of the present invention when the zoom lens is focused at a wide angle end and at a telephoto end, respectively. FIG. 4A and FIG. 4B are aberration diagrams of the zoom lens according to Embodiment 2 when the zoom lens is focused at infinity at the wide angle end and at the telephoto end, respectively. Embodiment 2 relates to a zoom lens having a zoom ratio of 2.20, an aperture ratio of about 2.91, and an image pickup half angle of view of from about 54.47° to about 32.51°.

Figure 6A:
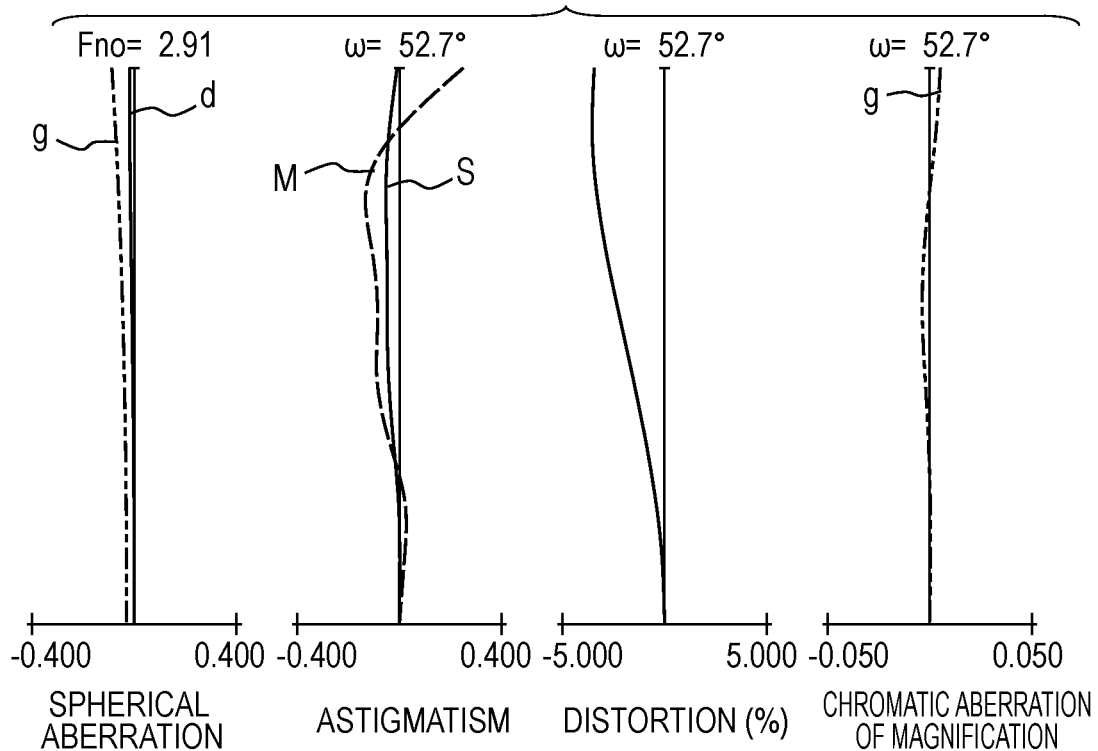
FIG. 6A is aberration diagrams of the zoom lens according to Embodiment 3 when the zoom lens is focused at infinity at the wide angle end.
Figure 6B:
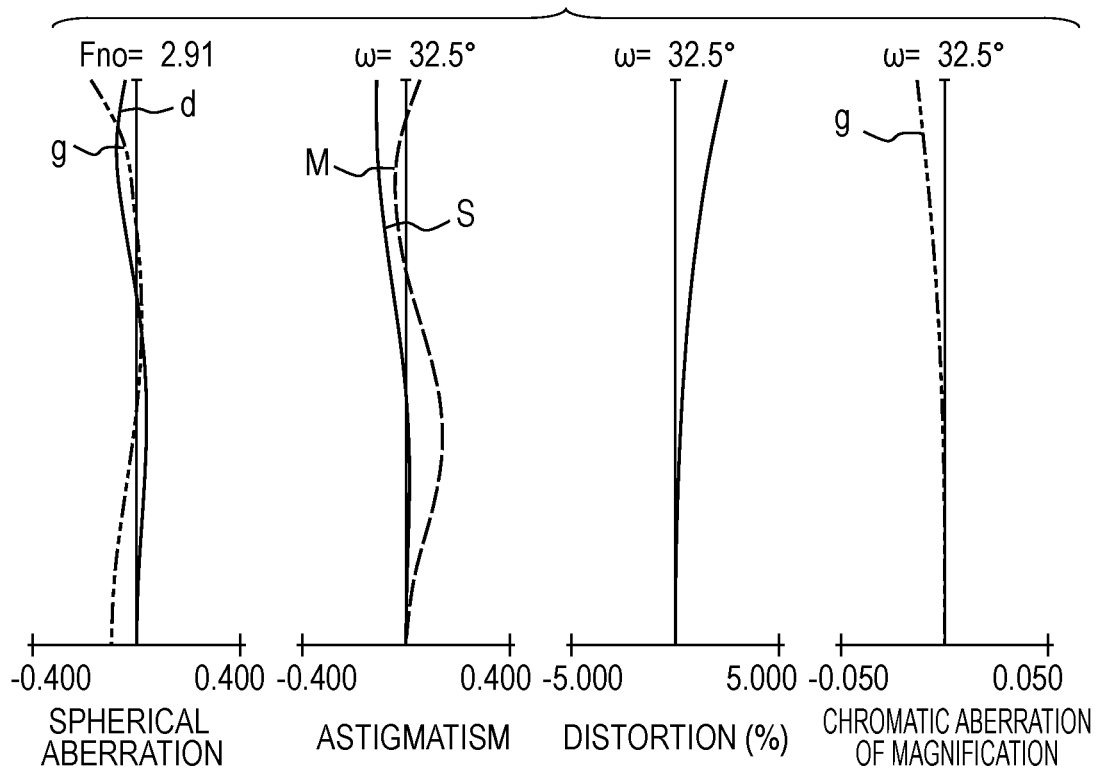
FIG. 6B is aberration diagrams of the zoom lens according to Embodiment 3 when the zoom lens is focused at infinity at the telephoto end.

FIG. 5A and FIG. 5B are lens cross-sectional views of a zoom lens according to Embodiment 3 of the present invention when the zoom lens is focused at a wide angle end and at a telephoto end, respectively. FIG. 6A and FIG. 6B are aberration diagrams of the zoom lens according to Embodiment 3 when the zoom lens is focused at infinity at the wide angle end and at the telephoto end, respectively. Embodiment 3 relates to a zoom lens having a zoom ratio of 2.06, an aperture ratio of about 2.91, and an image pickup half angle of view of from about 52.70° to about 32.51°.

Figure 8A:
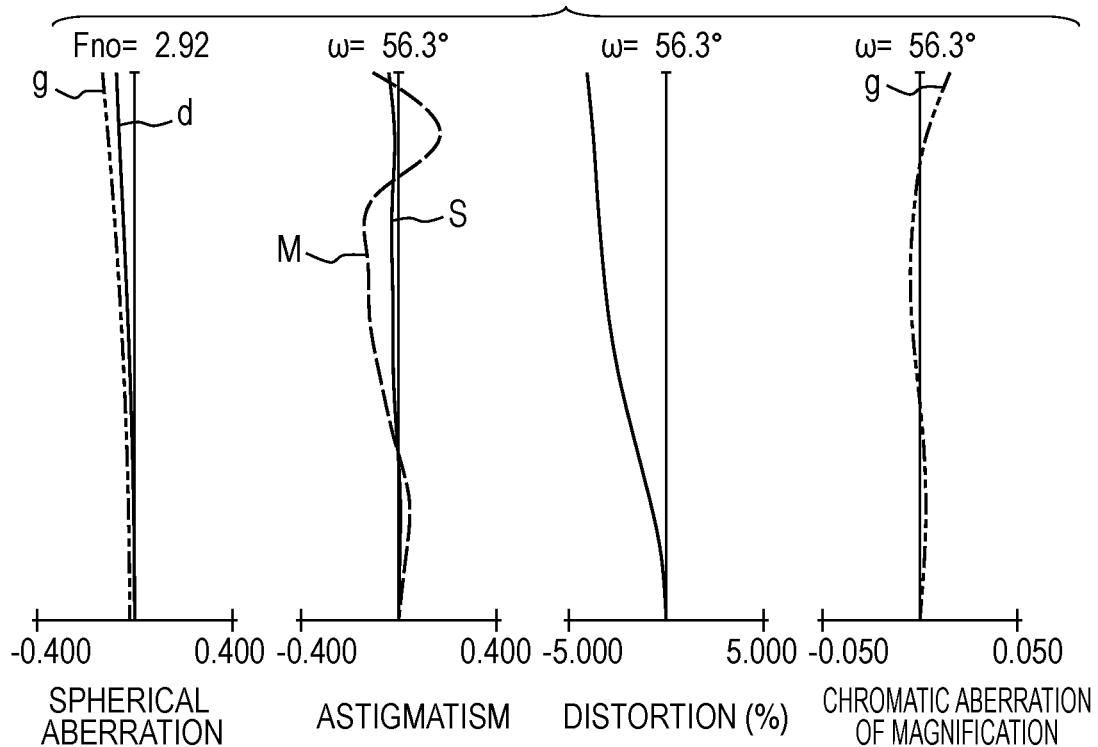
FIG. 8A is aberration diagrams of the zoom lens according to Embodiment 4 when the zoom lens is focused at infinity at the wide angle end.
Figure 8B:
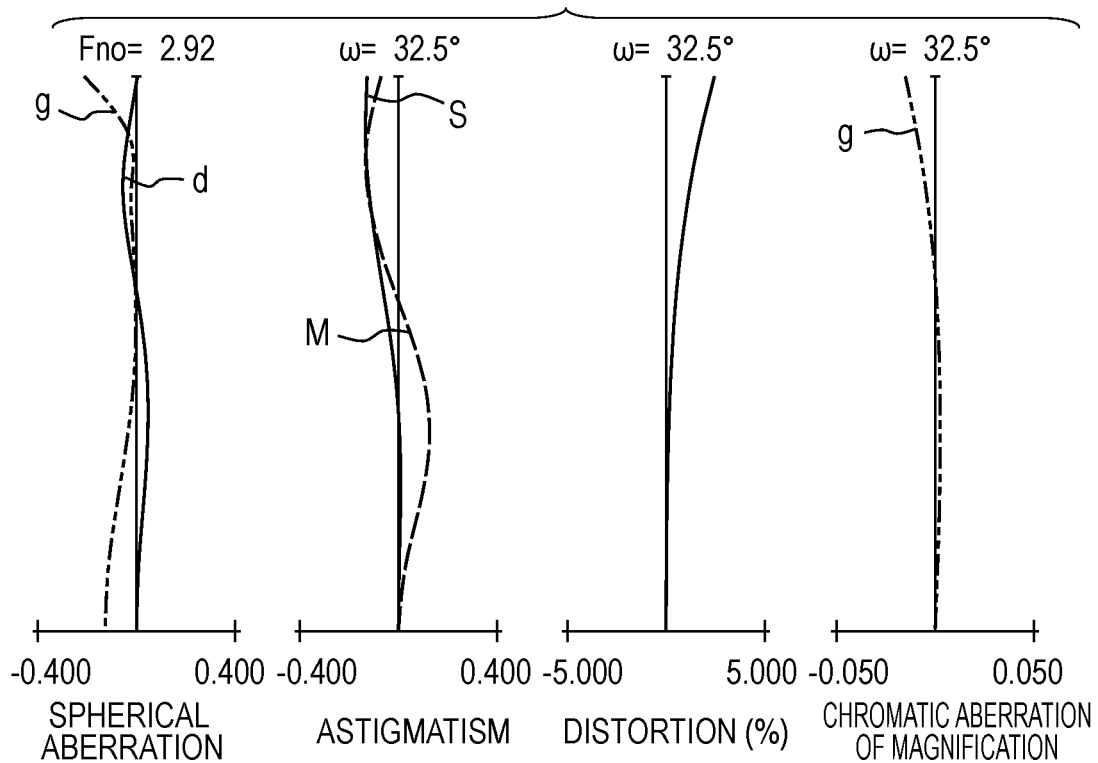
FIG. 8B is aberration diagrams of the zoom lens according to Embodiment 4 when the zoom lens is focused at infinity at the telephoto end.

FIG. 7A and FIG. 7B are lens cross-sectional views of a zoom lens according to Embodiment 4 of the present invention when the zoom lens is focused at a wide angle end and at a telephoto end, respectively. FIG. 8A and FIG. 8B are aberration diagrams of the zoom lens according to Embodiment 4 when the zoom lens is focused at infinity at the wide angle end and at the telephoto end, respectively. Embodiment 4 relates to a zoom lens having a zoom ratio of 2.35, an aperture ratio of about 2.92, and an image pickup half angle of view of from about 56.32° to about 32.51°.

Figure 9A:
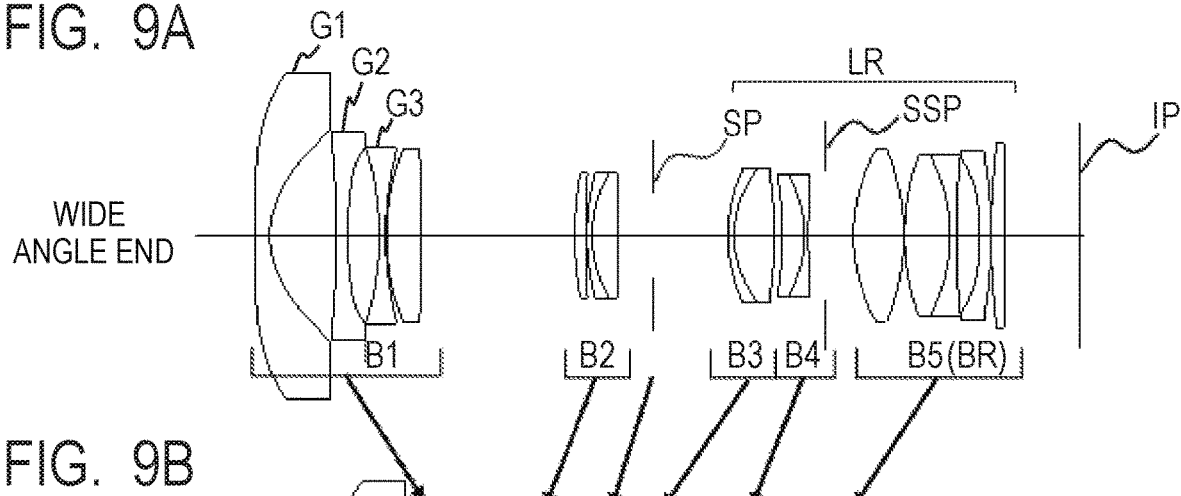
FIG. 9A is a lens cross-sectional view of a zoom lens according to Embodiment 5 of the present invention when the zoom lens is focused at infinity at a wide angle end.
Figure 9B:
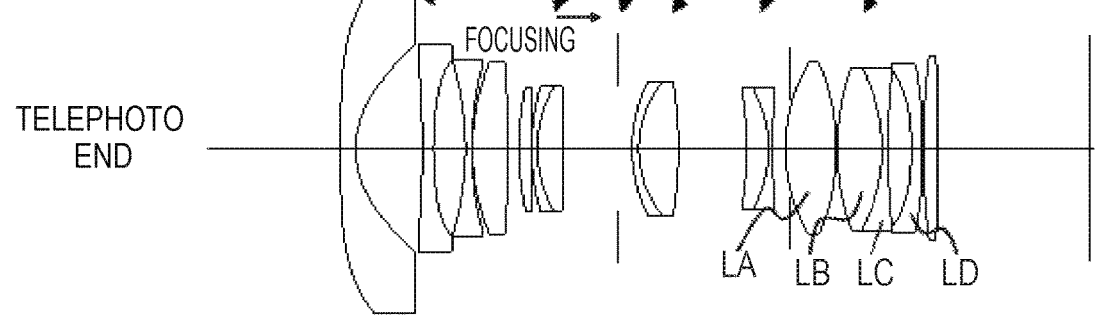
FIG. 9B is a lens cross-sectional view of a zoom lens according to Embodiment 5 of the present invention when the zoom lens is focused at infinity at a telephoto end.

FIG. 9A and FIG. 9B are lens cross-sectional views of a zoom lens according to Embodiment 5 of the present invention when the zoom lens is focused at a wide angle end and at a telephoto end, respectively. FIG. 10A and FIG. 10B are aberration diagrams of the zoom lens according to Embodiment 5 when the zoom lens is focused at infinity at the wide angle end and at the telephoto end, respectively. Embodiment 5 relates to a zoom lens having a zoom ratio of 2.02, an aperture ratio of about 2.92, and an image pickup half angle of view of from about 56.32° to about 36.63°.

Figure 11A:
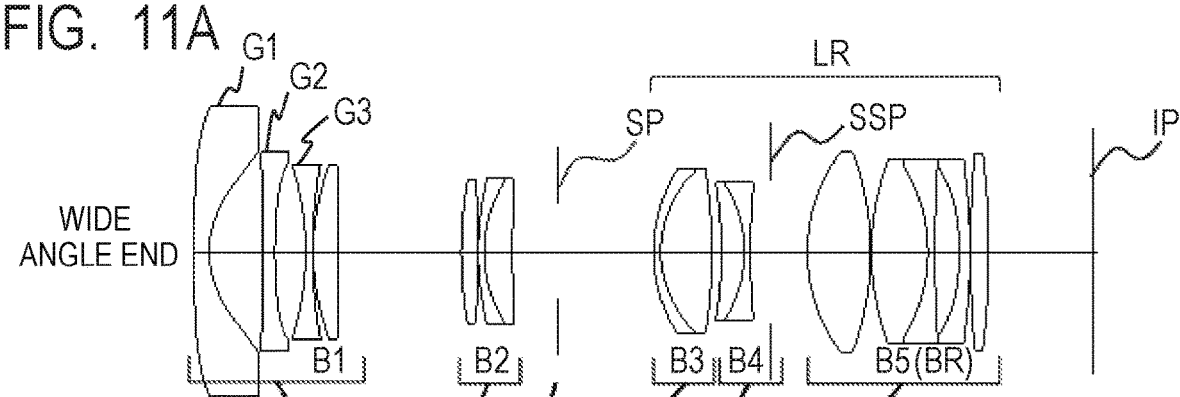
FIG. 11A is a lens cross-sectional view of a zoom lens according to Embodiment 6 of the present invention when the zoom lens is focused at infinity at a wide angle end.
Figure 11B:
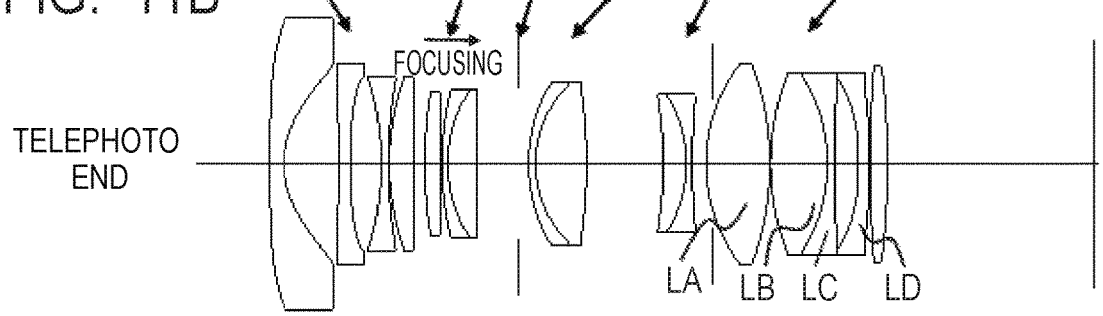
FIG. 11B is a lens cross-sectional view of a zoom lens according to Embodiment 6 of the present invention when the zoom lens is focused at infinity at a telephoto end.
Figure 12A:
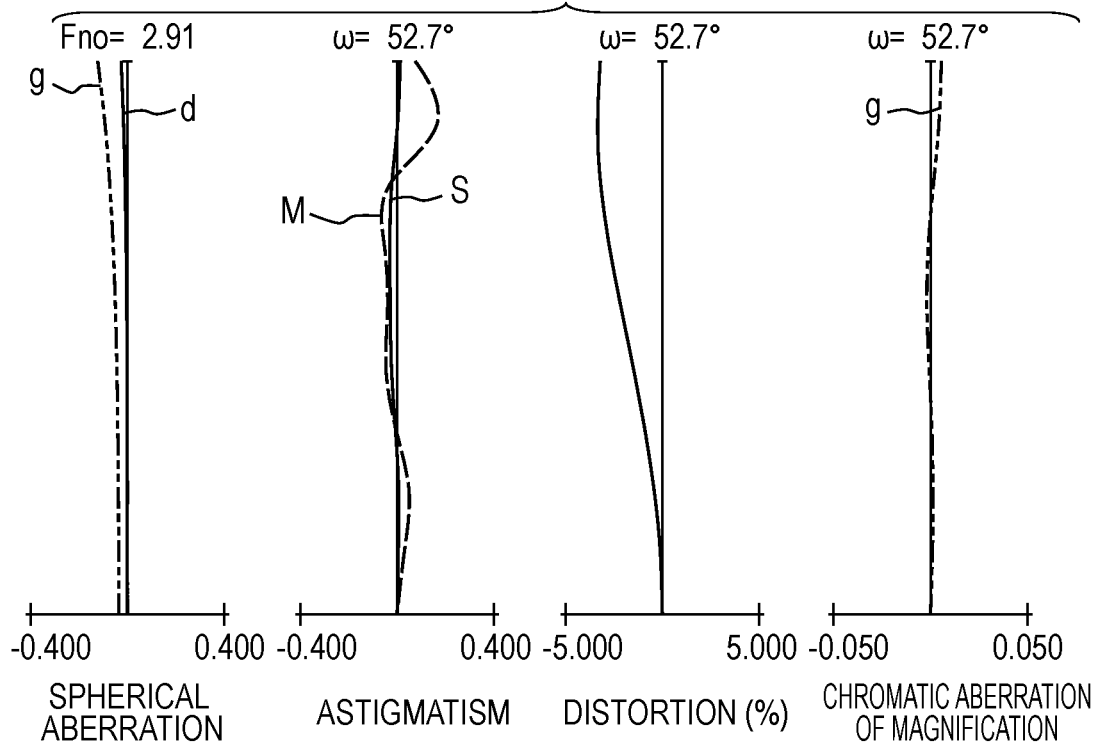
FIG. 12A is aberration diagrams of the zoom lens according to Embodiment 6 when the zoom lens is focused at infinity at the wide angle end.
Figure 12B:
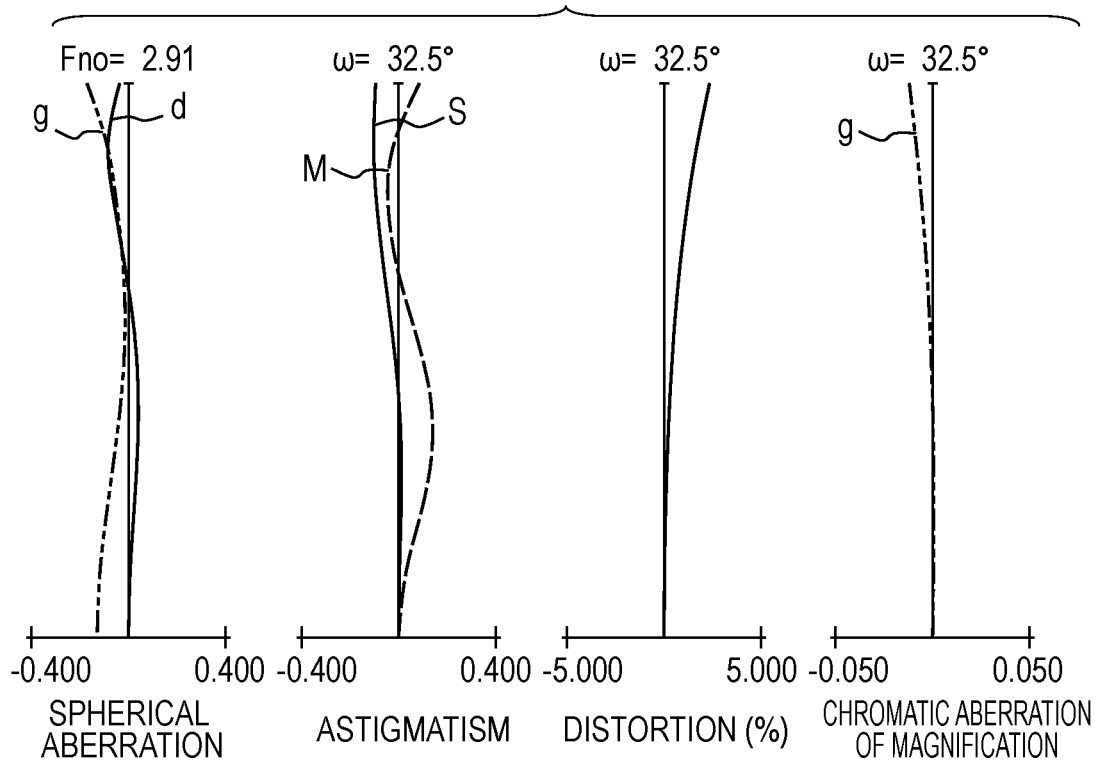
FIG. 12B is aberration diagrams of the zoom lens according to Embodiment 6 when the zoom lens is focused at infinity at the telephoto end.

FIG. 11A and FIG. 11B are lens cross-sectional views of a zoom lens according to Embodiment 6 of the present invention when the zoom lens is focused at a wide angle end and at a telephoto end, respectively. FIG. 12A and FIG. 12B are aberration diagrams of the zoom lens according to Embodiment 6 when the zoom lens is focused at infinity at the wide angle end and at the telephoto end, respectively. Embodiment 6 relates to a zoom lens having a zoom ratio of 2.06, an aperture ratio of about 2.91, and an image pickup half angle of view of from about 52.70° to about 32.51°.

Figure 13A:
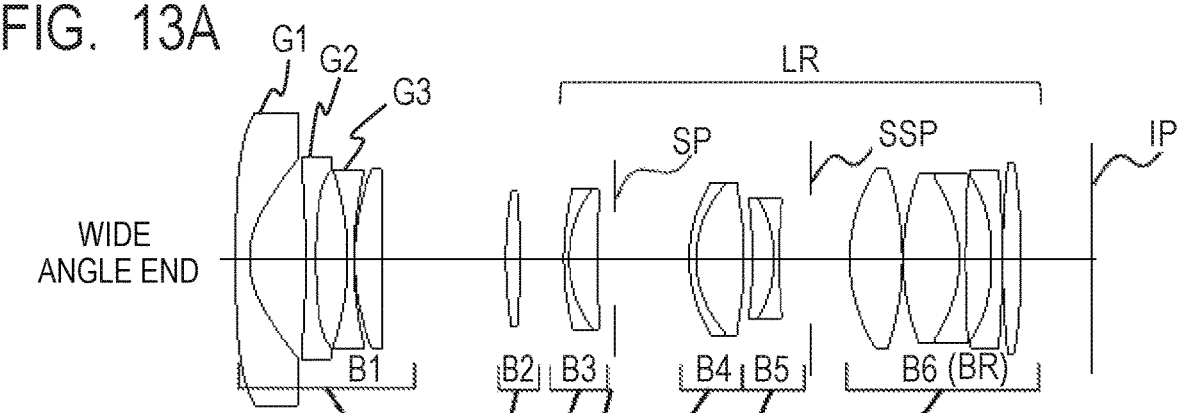
FIG. 13A is a lens cross-sectional view of a zoom lens according to Embodiment 7 of the present invention when the zoom lens is focused at infinity at a wide angle end.
Figure 13B:
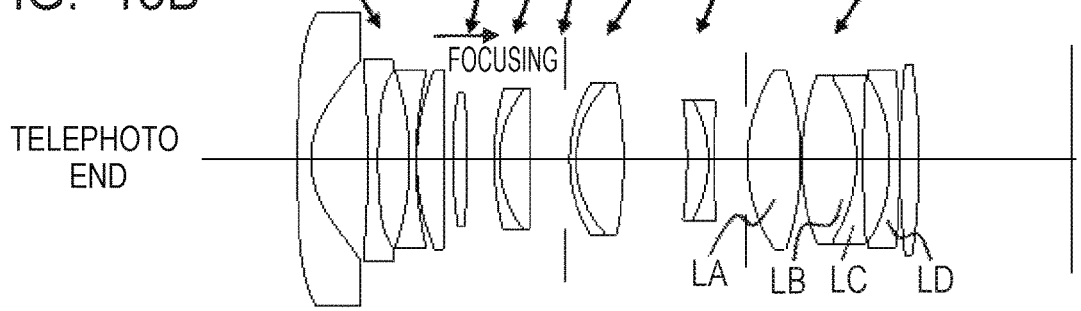
FIG. 13B is a lens cross-sectional view of a zoom lens according to Embodiment 7 of the present invention when the zoom lens is focused at infinity at a telephoto end.
Figure 14A:
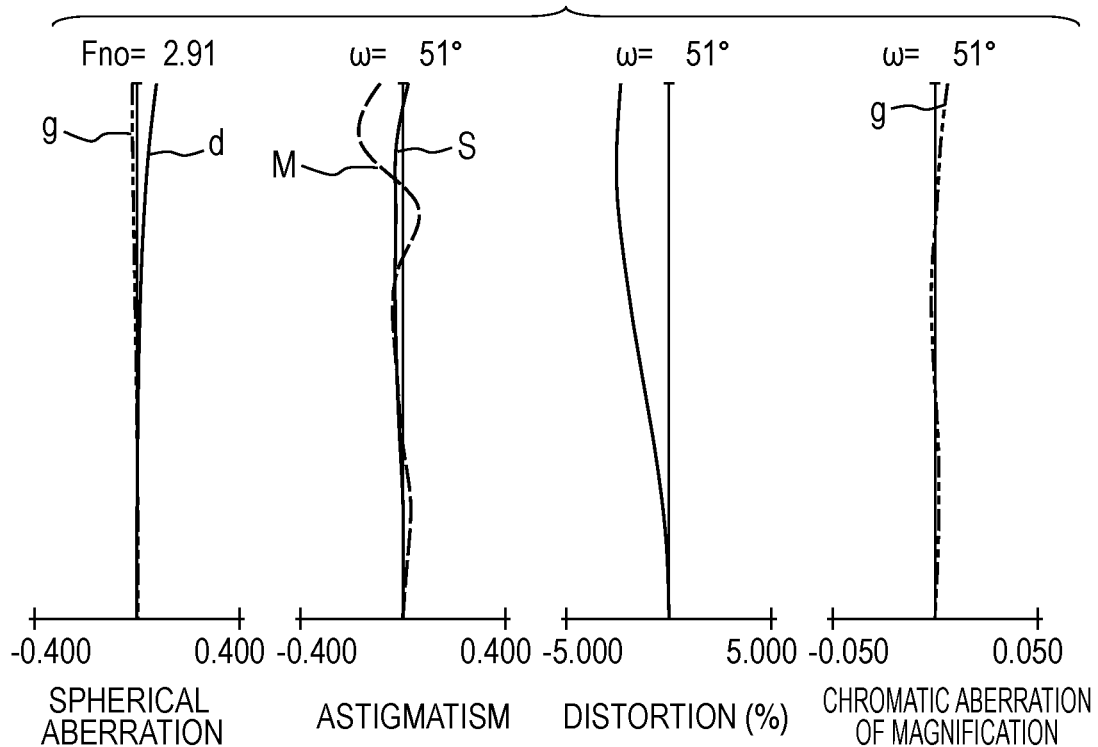
FIG. 14A is aberration diagrams of the zoom lens according to Embodiment 7 when the zoom lens is focused at infinity at the wide angle end.
Figure 14B:
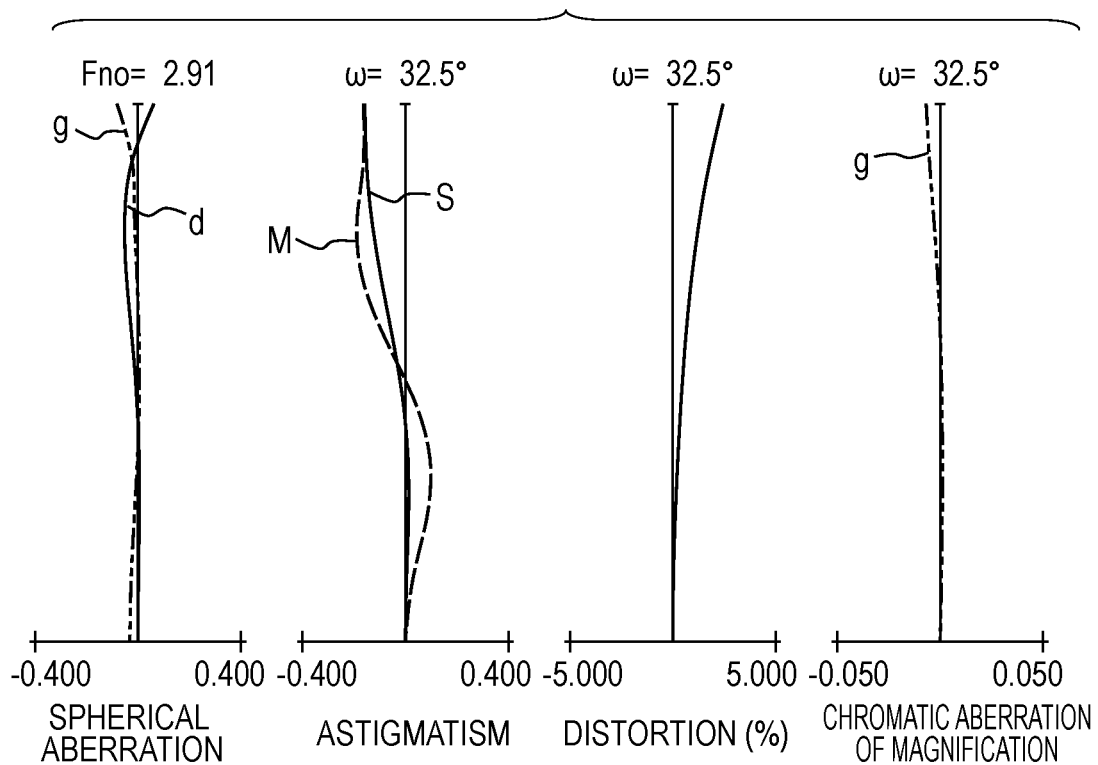
FIG. 14B is aberration diagrams of the zoom lens according to Embodiment 7 when the zoom lens is focused at infinity at the telephoto end.

FIG. 13A and FIG. 13B are lens cross-sectional views of a zoom lens according to Embodiment 7 of the present invention when the zoom lens is focused at a wide angle end and at a telephoto end, respectively. FIG. 14A and FIG. 14B are aberration diagrams of the zoom lens according to Embodiment 7 when the zoom lens is focused at infinity at the wide angle end and at the telephoto end, respectively. Embodiment 7 relates to a zoom lens having a zoom ratio of 1.94, an aperture ratio of about 2.91, and an image pickup half angle of view of from about 51.03° to about 32.51°.

Figure 15:
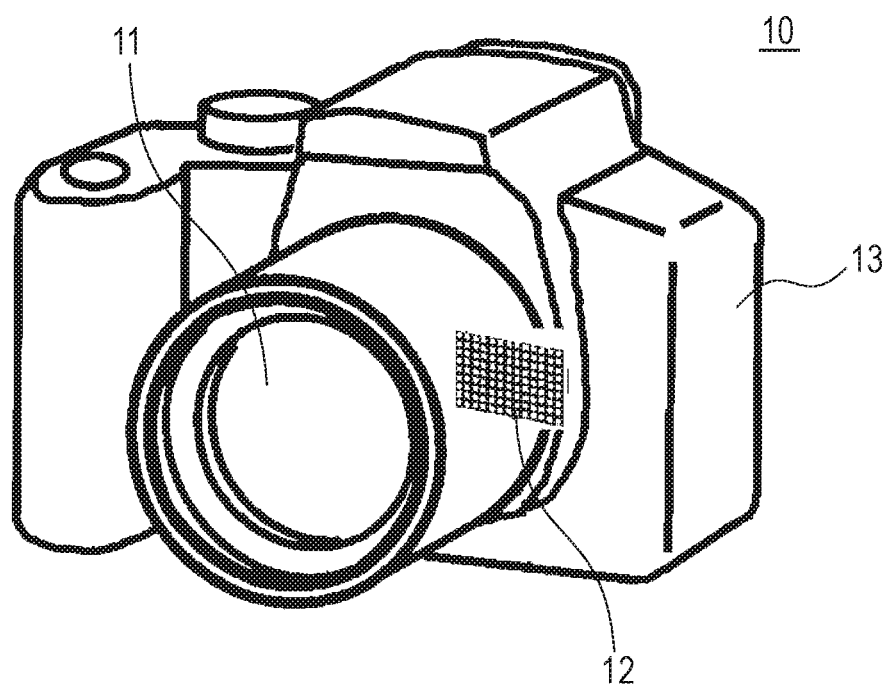
FIG. 15 is a schematic view of a main part of an image pickup apparatus according to at least one embodiment of the present invention.

FIG. 15 is a schematic view of a main part of an image pickup apparatus including the zoom lens according to at least one embodiment of the present invention.

The zoom lens according to each Embodiment is an image pickup optical system to be used in a video camera, a digital camera, a monitoring camera, a television camera, and other image pickup apparatus. The zoom lens according to each Embodiment may also be used as a projection optical system for a projection apparatus (projector). In the lens cross-sectional views, the left side is the object side (front side), and the right side is the image side (rear side). Further, when "i" represents the order of a lens unit from the object side to the image side, an i-th lens unit is denoted by Bi. A rear lens group LR includes a plurality of lens units. An aperture stop SP is configured to determine (restrict) a light flux at the open F number (Fno). A variable stop SSP is changed in aperture during zooming.

When the zoom lens according to each Embodiment is used with a video camera, a digital camera, and other image pickup apparatus, an image plane IP corresponds to a CCD sensor, a CMOS sensor, and other image pickup elements (photoelectric conversion elements). During zooming from the wide angle end to the telephoto end, the lens units are configured to move as indicated by the solid-line arrows in the figures. During focusing from infinity to proximity, a lens unit is configured to move as indicated by the arrow labeled "focusing" in the figure.

In the spherical aberration diagrams, an F-number is represented by Fno, the solid line indicates spherical aberration with respect to the d-line (wavelength: 587.6 nm), and the two-dot chain line indicates spherical aberration with respect to the g-line (wavelength: 435.8 nm). In the astigmatism diagrams, the solid line S indicates a sagittal image plane at the d-line, and the broken line M indicates a meridional image plane at the d-line. Distortion indicates distortion with respect to the d-line. In the chromatic aberration diagrams, chromatic aberration with respect to the g-line is illustrated. An image pickup half angle of view (angle) is represented by "ω". In each Embodiment, the "wide angle end" and the "telephoto end" are zoom positions at the time when the lens units are located at the ends of a mechanically movable range, respectively.

In the following, features of the zoom lens according to each Embodiment are described. The zoom lens according to each Embodiment consists of, in order from the object side to the image side, a first lens unit B1 having a negative refractive power, a second lens unit B2 having a positive refractive power, and the rear lens group LR including at least two lens units. At least the first lens unit B1 and the second lens unit B2 are configured to move during zooming.

Further, the first lens unit B1 includes, in order from the object side to the image side, a negative lens G1, a negative lens G2, a negative lens G3, and at least three negative lenses. With three lenses as counted from the object side to the image side of the lenses included in the first lens unit B1 being negative lenses, a wide angle of view is easily achieved. As compared to a case in which a positive lens is included in three lenses as counted from the object side to the image side, an effective diameter of a front lens element is easily reduced. Further, at least one of a lens surface on the object side or a lens surface on the image side of the negative lens G1 has the aspherical shape. With the negative lens G1 being an aspherical lens, distortion is reduced at the wide angle end.

Further, in each Embodiment, a focal length of the first lens unit B1 is represented by f1, a focal length of a lens unit BR arranged closest to the image side in the rear lens group LR is represented by f_BR, a focal length of the zoom lens at the telephoto end is represented by "ft", and a back focus at the wide angle end is represented by BFw. At this time, the following conditional expressions are satisfied.

$$0.20 < BFw/|f1| < 1.00 \tag{1}$$

$$0.50 < f\_BR/ft < 2.00 \tag{2}$$

Next, a technical meaning of each of the conditional expressions given above is described.

In the conditional expression (1), an appropriate range of a ratio between the focal length of the first lens unit B1 and the back focus at the wide angle end is defined. When the ratio exceeds the upper limit value of the conditional expression (1), and the back focus becomes much longer, it becomes difficult to downsize the zoom lens. In contrast, when the ratio falls below the lower limit value of the conditional expression (1), the negative refractive power of the first lens unit B1 becomes much weaker (and an absolute value of the negative focal length becomes much larger), and it becomes difficult for the zoom lens to achieve the wide angle of view.

In order to achieve the wide angle of view, it is required to strengthen positive refractive powers of the second lens unit B2 and subsequent lens units, or to increase intervals between the first lens unit B1 and the second lens unit B2 and each pair of subsequent lens units. In the former case, it becomes difficult to correct distortion and chromatic aberration of magnification, and in the latter case, it becomes difficult to downsize the zoom lens.

The back focus is a distance on the optical axis from the last lens surface (lens surface closest to the image side) in the zoom lens to the image plane. When optical members (such as a prism and a filter) having substantially no refractive power are inserted between the last lens surface and the image plane, an air-equivalent distance with those optical members removed is a back focus.

Further, when optical members (such as a cover glass and a filter) having substantially no refractive power are inserted closest to the object side in the zoom lens, those optical members are not treated as the first lens unit.

In the conditional expression (2), an appropriate range of a ratio between the focal length of the lens unit BR arranged closest to the image side and the focal length of the zoom lens at the telephoto end is defined. When the ratio exceeds the upper limit value of the conditional expression (2), and the positive refractive power of the lens unit BR becomes weaker, a difference between a position at which an axial ray passes in the lens unit BR and a position at which an off-axial ray passes in the lens unit BR at the wide angle end becomes smaller, and it becomes difficult to correct off-axial aberration at the wide angle end. When the ratio falls below the lower limit value of the conditional expression (2), and the positive refractive power of the lens unit BR becomes stronger, it becomes difficult to correct spherical aberration and coma at the telephoto end.

When the conditional expressions (1) and (2) are satisfied, the zoom lens having the small size and high optical performance over the entire zoom range is obtained.

In each Embodiment, it is further preferred to satisfy at least one of the following conditional expressions given below.

The lens unit BR includes a positive lens LA (first positive lens) closest to the object side, and an Abbe number of a material of the positive lens LA is represented by vd_LA. In the lens unit BR, a positive lens LB (second positive lens) is included adjacent to, and on the image side of, the positive lens LA, and an Abbe number of a material of the positive lens LB is represented by vd_LB. A focal length of the positive lens LA is represented by f_LA. The lens unit BR includes a negative lens LC (fourth negative lens) adjacent to, and on the image side of, the positive lens LB, and a focal length of the negative lens LC is represented by f_LC.

The lens unit BR includes a plurality of negative lenses, and an average value of refractive indices of materials of the negative lenses included in the lens unit BR is represented by Nd_BRN. In an image pickup apparatus including: a zoom lens; and an image pickup element configured to receive an image formed by the zoom lens, an image pickup half angle of view at the wide angle end is represented by "ω".

At this time, it is preferred to satisfy at least one of the following conditional expressions.

$$vd\_LA > 70 \tag{3}$$

$$vd\_LB > 70 \tag{4}$$

$$0.5 < f\_LA/ft < 1.8 \tag{5}$$

$$|f\_LC|/ft < 1.0 \tag{6}$$

$$Nd\_BRN > 1.90 \tag{7}$$

$$\omega > 50° \tag{8}$$

Next, a technical meaning of each of the conditional expressions given above is described.

In the conditional expression (3), the Abbe number of the material of the positive lens LA arranged closest to the object side in the lens unit BR is defined. When the Abbe number falls below the lower limit value of the conditional expression (3), and the material of the positive lens LA becomes highly dispersive, it becomes difficult to correct chromatic aberration of magnification at the wide angle end.

In the conditional expression (4), the Abbe number of the material of the positive lens LB arranged adjacent to, and on the image side of, the lens LA is defined. When the Abbe number falls below the lower limit value of the conditional expression (4), and the material of the positive lens LB becomes highly dispersive, it becomes difficult to correct chromatic aberration of magnification at the wide angle end.

In the conditional expression (5), a ratio between the focal length of the positive lens LA and the focal length of the zoom lens at the telephoto end is defined. When the ratio exceeds the upper limit value of the conditional expression (5), and the refractive power of the positive lens LA becomes weaker, it becomes difficult to correct chromatic aberration of magnification at the wide angle end. When the ratio falls below the lower limit value of the conditional expression (5), and the refractive power of the positive lens LA becomes stronger, it becomes difficult to correct spherical aberration at the telephoto end.

In the conditional expression (6), a ratio between the focal length of the negative lens LC arranged adjacent to, and on the image side of, the positive lens LB and the focal length of the zoom lens at the telephoto end is defined. When the ratio exceeds the upper limit value of the conditional expression (6), and a negative refractive power of the negative lens LC becomes weaker, it becomes difficult to correct an astigmatic difference and distortion at the wide angle end.

In the conditional expression (7), the average value of the refractive indices of the materials of all the negative lenses included in the lens unit BR is defined. When the average value falls below the lower limit value of the conditional expression (7), it becomes difficult to satisfactorily correct an astigmatic difference at the wide angle end.

In the conditional expression (8), the image pickup half angle of view at the wide angle end is defined. When the conditional expression (8) is satisfied, the wide angle of view is easily achieved.

As described above, according to each Embodiment, the zoom lens having the small size and the high optical performance over the entire zoom range can be obtained.

It is more preferred to set the numerical ranges of the conditional expressions (1) to (7) as follows.

$$0.35 < BFw/|f1| < 0.90 \tag{1a}$$

$$0.80 < f\_BR/ft < 1.98 \tag{2a}$$

$$vd\_LA > 74 \tag{3a}$$

$$vd\_LB > 74 \tag{4a}$$

$$0.8 < f\_LA/ft < 1.6 \tag{5a}$$

$$|f\_LC|/ft < 0.9 \tag{6a}$$

$$Nd\_BRN > 1.92 \tag{7a}$$

It is still more preferred to set the numerical ranges of the conditional expressions (1a) to (7a) as follows.

$$0.50 < BFw/|f1| < 0.85 \tag{1b}$$

$$1.20 < f\_BR/ft < 1.97 \tag{2b}$$

$$vd\_LA > 80 \tag{3b}$$

$$vd\_LB > 74.5 \tag{4b}$$

$$1.0 < f\_LA/ft < 1.4 \tag{5b}$$

$$|f\_LC|/ft < 0.88 \tag{6b}$$

$$Nd\_BRN > 1.95 \tag{7b}$$

Further, in the lens unit BR, a negative lens LD (fifth negative lens) arranged adjacent to, and on the image side of, the negative lens LC has an aspherical shape, with the result that curvature of field and distortion are satisfactorily corrected at the wide angle end. A lens surface on the image side of the negative lens LC has a shape that is convex toward the object side, and a lens surface on the object side of the negative lens LD has a shape that is convex toward the image side. In this manner, a biconvex air lens is formed between the negative lens LC and the negative lens LD, with the result that an astigmatic difference is satisfactorily corrected at the wide angle end, and that coma is satisfactorily corrected at the telephoto end.

It is preferred that at least one of a lens surface on the object side or a lens surface on the image side of the negative lens G2 have an aspherical shape. With the negative lens G2 being an aspherical lens, it becomes easy to satisfactorily correct distortion and an astigmatic difference at the wide angle end, and spherical aberration at the telephoto end. It is also preferred that the negative lens G1 have an aspherical shape in which the positive refractive power is increased from an optical axis center to a periphery. With the negative lens G1 having the aspherical shape, it becomes easy to satisfactorily correct distortion at the wide angle end.

It is further preferred that a part or all of the second lens unit B2 be configured to move from the object side toward the image side during focusing from infinity to proximity. With a part or all of the second lens unit being used as a focus lens unit, a variation in curvature of field and a variation in spherical aberration at the time when an object distance is varied are easily suppressed.

Further, in each Embodiment, it is preferred that the rear lens group LR consist of, in order from the object side to the image side: a third lens unit B3 having a positive refractive power; a fourth lens unit B4 having a negative refractive power; and a fifth lens unit B5 having a positive refractive power. Alternatively, it is preferred that the rear lens group LR consist of, in order from the object side to the image side: a third lens unit B3 having a negative refractive power; and a fourth lens unit B4 having a positive refractive power. Still alternatively, it is preferred that the rear lens group LR consist of, in order from the object side to the image side: a third lens unit B3 having a positive refractive power; a fourth lens unit B4 having a positive refractive power; a fifth lens unit B5 having a negative refractive power; and a sixth lens unit B6 having a positive refractive power.

Next, a lens configuration of each Embodiment is described.

Embodiment 1

The zoom lens according to Embodiment 1 consists of, in order from the object side to the image side, the first lens unit B1 having a negative refractive power, the second lens unit B2 having a positive refractive power, and the rear lens group LR including a plurality of lens units. The rear lens group LR consists of the third lens unit B3 having a positive refractive power, the fourth lens unit B4 having a negative refractive power, and the fifth lens unit B5 having a positive refractive power.

During zooming from the wide angle end to the telephoto end, the first lens unit B1 is configured to move toward the image side, and the second lens unit B2 to the fifth lens unit B5 are configured to move toward the object side. During zooming, an interval between the first lens unit B1 and the second lens unit B2 is reduced, an interval between the second lens unit B2 and the third lens unit B3 is reduced, an interval between the third lens unit B3 and the fourth lens unit B4 is increased, and an interval between the fourth lens unit B4 and the fifth lens unit B5 is reduced. An aperture stop SP is arranged between the second lens unit B2 and the third lens unit B3. The aperture stop SP is configured to move toward the object side along a locus that is different from those of the second lens unit B2 and the third lens unit B3 during zooming from the wide angle end to the telephoto end. Further, the fourth lens unit B4 includes a variable stop SSP closest to the image side.

The second lens unit B2 is configured to move from the object side toward the image side during focusing from infinity to proximity.

Embodiment 2

The zoom lens according to Embodiment 2 consists of, in order from the object side to the image side, the first lens unit B1 having a negative refractive power, the second lens unit B2 having a positive refractive power, and the rear lens group LR including a plurality of lens units. The rear lens group LR consists of the third lens unit B3 having a negative refractive power and the fourth lens unit B4 having a positive refractive power.

During zooming from the wide angle end to the telephoto end, the first lens unit B1 is configured to move toward the image side, and the second lens unit B2 to the fourth lens unit B4 are configured to move toward the object side. During zooming, an interval between the first lens unit B1 and the second lens unit B2 is reduced, an interval between the second lens unit B2 and the third lens unit B3 is increased, and an interval between the third lens unit B3 and the fourth lens unit B4 is reduced. An aperture stop SP is arranged in the second lens unit B2. Further, the third lens unit B3 includes a variable stop SSP closest to the image side.

The second lens unit B2 consists of, in order from the object side to the image side: a first sub-lens unit B2A having a positive refractive power; and a second sub-lens unit B2B having a positive refractive power. During focusing from infinity to proximity, the first sub-lens unit B2A is configured to move from the object side toward the image side.

Embodiment 3

In the zoom lens according to Embodiment 3 of the present invention, the number of lens units, signs of refractive powers of the lens units, and a zoom type, for example, movement conditions of the lens units during zooming are the same as those in Embodiment 1. Positions of an aperture stop SP and a variable stop SSP are also the same as those in Embodiment 1. A lens unit configured to move during focusing and a movement condition thereof are also the same as those in Embodiment 1.

Embodiment 4

The zoom lens according to Embodiment 4 has the same zoom type as that in Embodiment 1. Positions of an aperture stop SP and a variable stop SSP are also the same as those in Embodiment 1. A lens unit configured to move during focusing and a movement condition thereof are also the same as those in Embodiment 1.

Embodiment 5

The zoom lens according to Embodiment 5 has the same zoom type as that in Embodiment 1. Positions of an aperture stop SP and a variable stop SSP are also the same as those in Embodiment 1. A lens unit configured to move during focusing and a movement condition thereof are also the same as those in Embodiment 1.

Embodiment 6

The zoom lens according to Embodiment 6 has the same zoom type as that in Embodiment 1. Positions of an aperture stop SP and a variable stop SSP are also the same as those in Embodiment 1. A lens unit configured to move during focusing and a movement condition thereof are also the same as those in Embodiment 1.

Embodiment 7

The zoom lens according to Embodiment 7 consists of, in order from the object side to the image side, the first lens unit B1 having a negative refractive power, the second lens unit B2 having a positive refractive power, and the rear lens group LR including a plurality of lens units. The rear lens group LR consists of the third lens unit B3 having a positive refractive power, the fourth lens unit B4 having a positive refractive power, the fifth lens unit B5 having a negative refractive power, and the sixth lens unit B6 having a positive refractive power.

During zooming from the wide angle end to the telephoto end, the first lens unit B1 is configured to move toward the image side, and the second lens unit B2 to the sixth lens unit B6 are configured to move toward the object side. During zooming, an interval between the first lens unit B1 and the second lens unit B2 is reduced, an interval between the second lens unit B2 and the third lens unit B3 is reduced, and an interval between the third lens unit B3 and the fourth lens unit B4 is reduced. Further, an interval between the fourth lens unit B4 and the fifth lens unit B5 is increased, and an interval between the fifth lens unit B5 and the sixth lens unit B6 is reduced.

An aperture stop SP is arranged between the third lens unit B3 and the fourth lens unit B4. The aperture stop SP is configured to move toward the object side along a locus that is different from those of the third lens unit B3 and the fourth lens unit B4 during zooming from the wide angle end to the telephoto end. Further, the fifth lens unit B5 includes a variable stop SSP closest to the image side. During focusing from infinity to proximity, the second lens unit B2 is configured to move from the object side toward the image side.

Exemplary embodiments of the present invention have been described above, but the present invention is not limited to those embodiments, and various changes and modifications can be made thereto within the scope of the gist thereof. For example, at least a part of a particular lens unit may be used as an image stabilizing lens unit. Further, in the optical system according to each of Embodiments 1 to 7, the focus lens unit is one lens unit (or sub-lens unit), but a plurality of lens units may be used as focus lens units. This type of focusing method is also called "floating".

Further, the optical system may include not only refractive optical elements (so-called lenses) but also diffractive optical elements, or may include a reflective optical member.

Next, an Embodiment of an image pickup apparatus using the zoom lens according to at least one embodiment of the present invention as an image pickup optical system is described with reference to FIG. 15. The image pickup apparatus is an image pickup apparatus using an image pickup element, for example, a digital still camera, a video camera, a monitoring camera, or a broadcasting camera.

In FIG. 15, an image pickup apparatus 10 includes: a camera main body 13; a lens apparatus 11 including the zoom lens according to each of Embodiments 1 to 7 described above; and a light receiving element (image pickup element) 12 configured to photoelectrically convert an image formed by the zoom lens. As the light receiving element 12, a CCD sensor, a CMOS sensor, and other image pickup elements may be used. The lens apparatus 11 and the camera main body 13 may be configured integrally, or may be configured to be removable.

Through application of the zoom lens according to at least one embodiment of the present invention to a digital still camera and other image pickup apparatus as described above, an image pickup apparatus having a small size and high optical performance from infinity to a close distance can be obtained.

Next, numerical data sets 1 to 7 corresponding to Embodiments 1 to 7 of the present invention, respectively, are shown. In each numerical value data set, a curvature radius of the i-th surface from the object side is represented by "ri", a lens thickness or an air interval between the i-th surface and the (i+1)th surface from the object side is represented by "di", and a refractive index and an Abbe number of a material of an optical member between the i-th surface and the (i+1)th surface from the object side are represented by "ni" and "vi", respectively. A back focus BF is an air-equivalent distance. The total length of the zoom lens is a value obtained by adding the value of the back focus to a distance from the first lens surface to the last lens surface. Symbol "*" suffixed to a surface number means a surface having an aspherical shape. The aspherical shape has an X axis set in the optical axis direction, an H axis set in a direction perpendicular to the optical axis, and a direction of travel of light defined as positive. Then, when a paraxial curvature radius is represented by R, a conic constant is represented by K, and aspherical coefficients are represented by A4, A6, A8, A10, A12, A14, and A16, the aspherical shape is expressed by the following expression.

$$X = \frac{H^2/R}{1+\sqrt{1-(1+K)(H/R)^2}} + A4 \cdot H^4 + A6 \cdot H^6 + A8 \cdot H^8 + A10 \cdot H^{10} + A12 \cdot H^{12} + A14 \cdot H^{14} + A16 \cdot H^{16}$$

The notation "e-x" in an aspherical coefficient means $\times 10^{-x}$.

Further, relationships between the above-mentioned conditional expressions and Embodiments 1 to 7 are shown in Table 1.

(Numerical Data 1)

| Surface data | | | | | |
|---|---|---|---|---|---|
| Surface number | r | d | nd | vd | Effective diameter |
| 1* | 3,000.000 | 2.85 | 1.58313 | 59.4 | 55.04 |
| 2* | 16.526 | 10.57 | | | 37.84 |
| 3* | −809.327 | 2.25 | 1.85400 | 40.4 | 36.45 |
| 4* | 91.828 | 5.56 | | | 31.48 |
| 5 | −53.256 | 1.20 | 1.59522 | 67.7 | 31.18 |
| 6 | 68.528 | 0.15 | | | 30.87 |
| 7 | 43.587 | 5.03 | 1.85478 | 24.8 | 31.10 |
| 8 | −485.244 | (Variable) | | | 30.62 |
| 9 | 63.607 | 2.67 | 1.84666 | 23.9 | 24.64 |
| 10 | −1,472.964 | 0.15 | | | 24.78 |
| 11 | 52.737 | 1.00 | 1.92286 | 20.9 | 25.07 |
| 12 | 22.996 | 5.41 | 1.53172 | 48.8 | 24.62 |

-continued

| | | | | | |
|---|---|---|---|---|---|
| 13 | 489.976 | (Variable) | | | 24.90 |
| 14 (Stop) | ∞ | (Variable) | | | 26.65 |
| 15 | 27.733 | 1.20 | 2.00069 | 25.5 | 27.72 |
| 16 | 19.641 | 9.29 | 1.53775 | 74.7 | 26.54 |
| 17 | −78.882 | (Variable) | | | 26.33 |
| 18 | −67.558 | 4.31 | 1.92286 | 20.9 | 21.98 |
| 19 | −20.948 | 0.77 | 1.83400 | 37.2 | 22.48 |
| 20 | 136.126 | 3.52 | | | 23.78 |
| 21 | ∞ | (Variable) | | | 25.93 |
| 22 | 30.487 | 11.20 | 1.49700 | 81.6 | 34.86 |
| 23 | −50.182 | 0.15 | | | 34.68 |
| 24 | 40.928 | 11.00 | 1.49700 | 81.6 | 31.47 |
| 25 | −25.800 | 1.20 | 2.05090 | 26.9 | 29.51 |
| 26 | 208.835 | 4.54 | | | 29.48 |
| 27* | −73.669 | 2.10 | 1.85400 | 40.4 | 29.55 |
| 28* | −1,000.000 | 0.15 | | | 32.11 |
| 29 | 216.036 | 3.40 | 1.92286 | 20.9 | 34.25 |
| 30 | −127.538 | (Variable) | | | 34.88 |
| Image plane | ∞ | | | | |

Aspherical surface data

First surface $K = 0.00000e+000$  $A4 = 8.30213e-006$  $A6 = -1.33976e-008$  $A8 = 4.25008e-011$
$A10 = -8.60253e-014$  $A12 = 1.03363e-016$  $A14 = -7.03702e-020$  $A16 = 2.16318e-023$ Second surface $K = -9.81344e-001$  $A4 = 4.49709e-007$  $A6 = -2.34544e-008$  $A8 = -1.05516e-010$
$A10 = 8.07443e-013$  $A12 = -2.78552e-015$  $A14 = 3.05128e-018$ Third surface $K = 0.00000e+000$  $A4 = -9.01759e-006$  $A6 = -1.39642e-007$  $A8 = 1.23272e-009$
$A10 = -3.49283e-012$  $A12 = 3.62808e-015$  $A14 = 5.24953e-019$  $A16 = -2.43479e-021$ Fourth surface $K = 0.00000e+000$  $A4 = 6.34981e-006$  $A6 = -1.29871e-007$  $A8 = 1.67920e-009$
$A10 = -6.48374e-012$  $A12 = 1.50043e-014$  $A14 = -1.59777e-017$ Twenty-seventh surface $K = 0.00000e+000$  $A4 = -8.04129e-005$  $A6 = 2.64851e-007$  $A8 = -1.06038e-009$
$A10 = 4.87911e-012$  $A12 = -8.56493e-015$  $A14 = -1.17880e-018$  $A16 = -3.10043e-023$ Twenty-eighth surface $K = 0.00000e+000$  $A4 = -6.00659e-005$  $A6 = 2.67376e-007$  $A8 = -7.05021e-010$
$A10 = 2.04492e-012$  $A12 = -2.97985e-015$ Various data
Zoom ratio 2.20

| | Wide angle | Intermediate | Telephoto |
|---|---|---|---|
| Focal length | 15.45 | 24.00 | 33.95 |
| F-number | 2.91 | 2.91 | 2.91 |
| Half angle of view (degrees) | 54.47 | 42.03 | 32.51 |
| Image height | 21.64 | 21.64 | 21.64 |
| Total lens length | 159.58 | 147.49 | 144.99 |
| BF | 14.00 | 22.21 | 32.15 |
| d8 | 25.32 | 7.72 | 1.50 |
| d13 | 8.24 | 11.30 | 7.40 |
| d14 | 13.71 | 5.42 | 0.71 |
| d17 | 1.60 | 9.89 | 14.61 |
| d21 | 7.04 | 1.27 | −1.05 |
| d30 | 14.00 | 22.21 | 32.15 |

Lens unit data

| Unit | First surface | Focal length | Lens structure length | Front principal point position | Rear principal point position |
|---|---|---|---|---|---|
| 1 | 1 | −21.75 | 27.61 | 3.35 | −19.34 |
| 2 | 9 | 73.31 | 9.23 | −0.96 | −6.54 |
| 3 | 15 | 52.20 | 10.49 | 1.65 | −5.23 |
| 4 | 18 | −63.99 | 8.60 | 0.43 | −5.73 |
| 5 | 22 | 51.49 | 33.74 | −7.53 | −27.53 |

-continued

| Single lens data | | |
|---|---|---|
| Lens | First surface | Focal length |
| 1 | 1 | −28.51 |
| 2 | 3 | −96.46 |
| 3 | 5 | −50.16 |
| 4 | 7 | 47.00 |
| 5 | 9 | 72.07 |
| 6 | 11 | −44.91 |
| 7 | 12 | 45.20 |
| 8 | 15 | −72.66 |
| 9 | 16 | 30.24 |
| 10 | 18 | 31.50 |
| 11 | 19 | −21.72 |
| 12 | 22 | 40.00 |
| 13 | 24 | 33.68 |
| 14 | 25 | −21.79 |
| 15 | 27 | −93.22 |
| 16 | 29 | 87.31 |

(Numerical Data 2)

| Surface data | | | | | |
|---|---|---|---|---|---|
| Surface number | r | d | nd | νd | Effective diameter |
| 1* | 3,000.000 | 2.00 | 1.76385 | 48.5 | 53.56 |
| 2* | 19.650 | 10.40 | | | 40.07 |
| 3* | −3,000.000 | 1.70 | 1.85400 | 40.4 | 38.49 |
| 4* | 97.522 | 6.08 | | | 33.40 |
| 5 | −52.452 | 1.10 | 1.53775 | 74.7 | 33.16 |
| 6 | 89.001 | 0.15 | | | 32.98 |
| 7 | 54.015 | 4.64 | 2.00069 | 25.5 | 33.17 |
| 8 | −602.659 | (Variable) | | | 32.72 |
| 9 | 59.323 | 3.01 | 1.84666 | 23.8 | 24.98 |
| 10 | −459.055 | 0.15 | | | 25.09 |
| 11 | 62.652 | 1.04 | 1.92286 | 20.9 | 25.24 |
| 12 | 21.504 | 5.42 | 1.61293 | 37.0 | 24.70 |
| 13 | 174.715 | 7.78 | | | 24.87 |
| 14 (Stop) | ∞ | 6.16 | | | 26.60 |
| 15 | 30.426 | 1.25 | 2.05090 | 26.9 | 28.90 |
| 16 | 22.569 | 9.57 | 1.49700 | 81.6 | 27.86 |
| 17 | −50.669 | (Variable) | | | 27.75 |
| 18 | −57.943 | 4.21 | 1.92286 | 20.9 | 22.54 |
| 19 | −21.964 | 1.00 | 1.83400 | 37.2 | 22.57 |
| 20 | 144.153 | 3.29 | | | 22.35 |
| 21 | ∞ | (Variable) | | | 22.47 |
| 22 | 27.650 | 11.56 | 1.43875 | 94.7 | 34.75 |
| 23 | −54.959 | 0.15 | | | 34.55 |
| 24 | 38.950 | 10.98 | 1.53775 | 74.7 | 31.85 |
| 25 | −28.847 | 1.23 | 2.05090 | 26.9 | 29.87 |
| 26 | 85.500 | 4.80 | | | 29.32 |
| 27* | −117.476 | 1.50 | 1.85400 | 40.4 | 29.42 |
| 28* | −1,000.000 | 0.15 | | | 31.53 |
| 29 | 66.737 | 3.39 | 1.95906 | 17.5 | 35.81 |
| 30 | 322.582 | (Variable) | | | 36.10 |
| Image plane | ∞ | | | | |

| Aspherical surface data |
|---|
| First surface |

K = 0.00000e+000   A4 = 1.03175e−005   A6 = −1.29560e−008   A8 = 4.11111e−011
A10 = −9.34836e−014   A12 = 1.24758e−016   A14 = −9.23542e−020   A16 = 3.05105e−023

Second surface

K = −1.00663e+000   A4 = −4.64102e−006   A6 = 4.20921e−009   A8 = −8.92908e−011
A10 = 6.57290e−013   A12 = −2.13101e−015   A14 = 2.10007e−018

Third surface

K = 0.00000e+000   A4 = −2.13702e−005   A6 = −5.96203e−008   A8 = 9.25870e−010
A10 = −3.11697e−012   A12 = 4.52311e−015   A14 = −2.37962e−018   A16 = −2.27694e−022

Fourth surface

K = 0.00000e+000  A4 = −3.29313e−006  A6 = −4.28221e−008  A8 = 1.13303e−009
A10 = −4.56784e−012  A12 = 9.71728e−015  A14 = −8.55924e−018

Twenty-seventh surface

K = 0.00000e+000  A4 = −8.10008e−005  A6 = 2.57535e−007  A8 = −1.40514e−009
A10 = 1.13260e−011  A12 = −5.30354e−014  A14 = 1.46810e−016  A16 = −2.14346e−019

Twenty-eighth surface

K = 0.00000e+000  A4 = −6.02918e−005  A6 = 2.33866e−007  A8 = −4.55043e−010
A10 = 2.07519e−012  A12 = −4.58917e−015

Various data
Zoom ratio 2.20

|  | Wide angle | Intermediate | Telephoto |
|---|---|---|---|
| Focal length | 15.45 | 24.00 | 33.95 |
| F-number | 2.91 | 2.91 | 2.91 |
| Half angle of view (degrees) | 54.47 | 42.03 | 32.51 |
| Image height | 21.64 | 21.64 | 21.64 |
| Total lens length | 164.24 | 151.54 | 150.97 |
| BF | 14.20 | 22.81 | 34.13 |
| d8 | 33.02 | 11.64 | 1.50 |
| d17 | 1.74 | 8.75 | 13.68 |
| d21 | 12.57 | 5.63 | −1.05 |
| d30 | 14.20 | 22.81 | 34.13 |

Lens unit data

| Unit | First surface | Focal length | Lens structure length | Front principal point position | Rear principal point position |
|---|---|---|---|---|---|
| 1 | 1 | −22.91 | 26.07 | 1.39 | −21.10 |
| 2 | 9 | 37.57 | 34.38 | 15.79 | −16.68 |
| 3 | 18 | −56.29 | 8.50 | 0.39 | −5.61 |
| 4 | 22 | 52.82 | 33.76 | −7.37 | −27.45 |

Single lens data

| Lens | First surface | Focal length |
|---|---|---|
| 1 | 1 | −25.90 |
| 2 | 3 | −110.57 |
| 3 | 5 | −61.21 |
| 4 | 7 | 49.71 |
| 5 | 9 | 62.21 |
| 6 | 11 | −35.91 |
| 7 | 12 | 39.48 |
| 8 | 15 | −90.54 |
| 9 | 16 | 32.84 |
| 10 | 18 | 36.29 |
| 11 | 19 | −22.79 |
| 12 | 22 | 43.80 |
| 13 | 24 | 32.67 |
| 14 | 25 | −20.41 |
| 15 | 27 | −155.99 |
| 16 | 29 | 87.17 |

(Numerical Data 3)

Surface data

| Surface number | r | d | nd | vd | Effective diameter |
|---|---|---|---|---|---|
| 1* | 3,000.000 | 2.85 | 1.58313 | 59.4 | 51.80 |
| 2* | 16.094 | 9.83 |  |  | 36.24 |
| 3* | −3,000.000 | 2.25 | 1.85400 | 40.4 | 35.05 |
| 4* | 94.780 | 5.52 |  |  | 30.76 |
| 5 | −48.479 | 1.22 | 1.59522 | 67.7 | 30.48 |
| 6 | 88.437 | 0.15 |  |  | 30.43 |

-continued

| | | | | | |
|---|---|---|---|---|---|
| 7 | 45.716 | 4.61 | 1.84666 | 23.9 | 30.72 |
| 8 | −800.000 | (Variable) | | | 30.33 |
| 9 | 67.202 | 2.80 | 1.85478 | 24.8 | 24.21 |
| 10 | −321.896 | 0.15 | | | 24.38 |
| 11 | 55.662 | 1.04 | 1.92286 | 20.9 | 24.66 |
| 12 | 23.425 | 5.12 | 1.53172 | 48.8 | 24.24 |
| 13 | 545.072 | (Variable) | | | 24.50 |
| 14 (Stop) | ∞ | (Variable) | | | 25.95 |
| 15 | 27.357 | 1.25 | 2.00069 | 25.5 | 27.18 |
| 16 | 19.481 | 8.91 | 1.53775 | 74.7 | 26.02 |
| 17 | −90.471 | (Variable) | | | 25.79 |
| 18 | −76.370 | 4.80 | 1.92286 | 20.9 | 22.15 |
| 19 | −22.599 | 0.97 | 1.83400 | 37.2 | 22.15 |
| 20 | 128.497 | 3.55 | | | 22.58 |
| 21 | ∞ | (Variable) | | | 24.78 |
| 22 | 29.814 | 10.71 | 1.49700 | 81.6 | 33.81 |
| 23 | −51.511 | 0.15 | | | 33.66 |
| 24 | 43.147 | 10.29 | 1.49700 | 81.6 | 30.98 |
| 25 | −28.537 | 1.23 | 2.05090 | 26.9 | 29.07 |
| 26 | 264.650 | 4.92 | | | 28.84 |
| 27* | −58.899 | 1.90 | 1.85400 | 40.4 | 28.87 |
| 28* | −481.984 | 0.15 | | | 31.35 |
| 29 | 196.609 | 3.51 | 1.92286 | 20.9 | 33.25 |
| 30 | −143.123 | (Variable) | | | 33.99 |
| Image plane | ∞ | | | | |

Aspherical surface data

First surface

K = 0.00000e+000   A4 = 7.78177e−006   A6 = −1.16227e−008   A8 = 3.61332e−011
A10 = −8.46807e−014   A12 = 1.32014e−016   A14 = −1.19838e−019   A16 = 4.73739e−023

Second surface

K = −9.92823e−001   A4 = 7.69669e−007   A6 = −2.26384e−008   A8 = −9.85352e−011
A10 = 6.27986e−013   A12 = −2.83991e−015   A14 = 3.85776e−018

Third surface

K = 0.00000e+000   A4 = −6.64637e−006   A6 = −1.30881e−007   A8 = 1.16505e−009
A10 = −3.85853e−012   A12 = 6.70940e−015   A14 = −6.86586e−018   A16 = 3.70998e−021

Fourth surface

K = 0.00000e+000   A4 = 8.70231e−006   A6 = −1.20128e−007   A8 = 1.60621e−009
A10 = −6.68148e−012   A12 = 1.72715e−014   A14 = −1.99239e−017

Twenty-seventh surface

K = 0.00000e+000   A4 = −8.02584e−005   A6 = 3.37144e−007   A8 = −1.26027e−009
A10 = 4.18861e−012   A12 = −7.10161e−015   A14 = 6.02476e−018   A16 = −2.38812e−020

Twenty-eighth surface

K = 0.00000e+000   A4 = −5.78382e−005   A6 = 3.44019e−007   A8 = −1.08923e−009
A10 = 2.82965e−012   A12 = −3.79229e−015

Various data
Zoom ratio 2.06

| | Wide angle | Intermediate | Telephoto |
|---|---|---|---|
| Focal length | 16.48 | 25.00 | 33.95 |
| F-number | 2.91 | 2.91 | 2.91 |
| Half angle of view (degrees) | 52.70 | 40.87 | 32.51 |
| Image height | 21.64 | 21.64 | 21.64 |
| Total lens length | 155.40 | 143.83 | 142.03 |
| BF | 14.79 | 23.49 | 32.80 |
| d8 | 21.05 | 6.62 | 1.50 |
| d13 | 6.87 | 9.00 | 6.34 |
| d14 | 16.01 | 6.25 | 1.65 |
| d17 | 1.60 | 9.09 | 12.93 |
| d21 | 7.22 | 1.51 | −1.05 |
| d30 | 14.79 | 23.49 | 32.80 |

-continued

| | | | | Front principal | Rear principal |
|---|---|---|---|---|---|
| | First | Focal | Lens structure | point | point |
| Unit | surface | length | length | position | position |

Lens unit data

| Unit | First surface | Focal length | Lens structure length | Front principal point position | Rear principal point position |
|---|---|---|---|---|---|
| 1 | 1 | −21.27 | 26.43 | 3.35 | −18.21 |
| 2 | 9 | 68.47 | 9.11 | −0.71 | −6.18 |
| 3 | 15 | 53.46 | 10.16 | 1.27 | −5.36 |
| 4 | 18 | −67.81 | 9.32 | 0.66 | −5.88 |
| 5 | 22 | 51.87 | 32.85 | −7.80 | −27.23 |

Single lens data

| Lens | First surface | Focal length |
|---|---|---|
| 1 | 1 | −27.76 |
| 2 | 3 | −107.55 |
| 3 | 5 | −52.43 |
| 4 | 7 | 51.20 |
| 5 | 9 | 65.26 |
| 6 | 11 | −44.52 |
| 7 | 12 | 45.88 |
| 8 | 15 | −73.44 |
| 9 | 16 | 30.68 |
| 10 | 18 | 33.35 |
| 11 | 19 | −22.98 |
| 12 | 22 | 39.73 |
| 13 | 24 | 36.29 |
| 14 | 25 | −24.46 |
| 15 | 27 | −78.73 |
| 16 | 29 | 90.20 |

(Numerical Data 4)

Surface data

| Surface number | r | d | nd | vd | Effective diameter |
|---|---|---|---|---|---|
| 1* | 3,000.000 | 2.85 | 1.58313 | 59.4 | 62.24 |
| 2* | 17.540 | 12.70 | | | 41.44 |
| 3* | 1,820.669 | 2.25 | 1.85400 | 40.4 | 39.60 |
| 4* | 75.488 | 6.60 | | | 33.51 |
| 5 | −57.046 | 1.20 | 1.59522 | 67.7 | 32.85 |
| 6 | 60.960 | 0.15 | | | 32.06 |
| 7 | 44.761 | 5.23 | 1.85478 | 24.8 | 32.17 |
| 8 | −512.578 | (Variable) | | | 31.58 |
| 9 | 65.327 | 2.45 | 1.80518 | 25.4 | 25.94 |
| 10 | 320.558 | 0.15 | | | 26.11 |
| 11 | 46.060 | 1.00 | 1.89286 | 20.4 | 26.61 |
| 12 | 24.356 | 6.00 | 1.54072 | 47.2 | 26.20 |
| 13 | −420.699 | (Variable) | | | 26.43 |
| 14 (Stop) | ∞ | (Variable) | | | 27.38 |
| 15 | 29.688 | 1.20 | 2.00069 | 25.5 | 28.03 |
| 16 | 20.101 | 9.16 | 1.53775 | 74.7 | 26.77 |
| 17 | −79.290 | (Variable) | | | 26.51 |
| 18 | −60.630 | 3.72 | 1.95906 | 17.5 | 21.80 |
| 19 | −22.291 | 0.75 | 1.85026 | 32.3 | 21.83 |
| 20 | 137.589 | 3.56 | | | 22.45 |
| 21 | ∞ | (Variable) | | | 24.91 |
| 22 | 32.425 | 10.45 | 1.49700 | 81.6 | 33.04 |
| 23 | −45.606 | 0.15 | | | 33.16 |
| 24 | 44.200 | 9.57 | 1.49700 | 81.6 | 31.11 |
| 25 | −32.406 | 1.20 | 2.05090 | 26.9 | 29.63 |
| 26 | 186.787 | 4.37 | | | 29.43 |
| 27* | −88.663 | 2.10 | 1.85400 | 40.4 | 29.48 |
| 28* | −1,000.000 | 0.15 | | | 31.81 |
| 29 | 135.867 | 2.79 | 1.92286 | 20.9 | 34.09 |
| 30 | −819.517 | (Variable) | | | 34.60 |
| Image plane | ∞ | | | | |

-continued

Aspherical surface data

First surface

K = 0.00000e+000  A4 = 9.12520e−006   A6 = −1.43067e−008  A8 = 4.34473e−011
A10 = −8.74550e−014  A12 = 1.02636e−016  A14 = −6.44042e−020  A16 = 1.67901e−023

Second surface

K = −8.85623e−001  A4 = 7.78378e−007   A6 = −8.44963e−009  A8 = −1.15336e−010
A10 = 9.37797e−013  A12 = −2.65612e−015  A14 = 2.28755e−018

Third surface

K = 0.00000e+000  A4 = −1.01770e−005  A6 = −1.38555e−007  A8 = 1.18997e−009
A10 = −3.41397e−012  A12 = 3.80258e−015  A14 = 2.87549e−019  A16 = −2.70841e−021

Fourth surface

K = 0.00000e+000  A4 = 3.81222e−006   A6 = −1.41511e−007  A8 = 1.65123e−009
A10 = −6.55657e−012  A12 = 1.50883e−014  A14 = −1.54177e−017

Twenty-seventh surface

K = 0.00000e+000  A4 = −7.03421e−005  A6 = 2.08994e−007   A8 = −9.63701e−010
A10 = 4.95291e−012  A12 = −1.12790e−014  A14 = 1.00977e−017  A16 = −1.70404e−020

Twenty-eighth surface

K = 0.00000e+000  A4 = −5.18294e−005  A6 = 2.16163e−007   A8 = −6.00400e−010
A10 = 2.09888e−012  A12 = −3.36889e−015

Various data
Zoom ratio 2.35

|  | Wide angle | Intermediate | Telephoto |
|---|---|---|---|
| Focal length | 14.42 | 24.00 | 33.95 |
| F-number | 2.92 | 2.92 | 2.92 |
| Half angle of view (degrees) | 56.32 | 42.03 | 32.51 |
| Image height | 21.64 | 21.64 | 21.64 |
| Total lens length | 162.41 | 149.27 | 146.70 |
| BF | 13.99 | 22.37 | 34.72 |
| d8 | 31.42 | 9.05 | 1.50 |
| d13 | 6.31 | 12.75 | 6.43 |
| d14 | 13.63 | 3.36 | 0.99 |
| d17 | 1.60 | 11.87 | 14.24 |
| d21 | 5.71 | 0.11 | −0.94 |
| d30 | 13.99 | 22.37 | 34.72 |

Lens unit data

| Unit | First surface | Focal length | Lens structure length | Front principal point position | Rear principal point position |
|---|---|---|---|---|---|
| 1 | 1 | −21.36 | 30.98 | 4.32 | −21.06 |
| 2 | 9 | 62.19 | 9.61 | 0.26 | −5.70 |
| 3 | 15 | 57.68 | 10.36 | 1.80 | −4.99 |
| 4 | 18 | −58.20 | 8.03 | 0.29 | −5.57 |
| 5 | 22 | 51.69 | 30.78 | −6.76 | −24.93 |

Single lens data

| Lens | First surface | Focal length |
|---|---|---|
| 1 | 1 | −30.27 |
| 2 | 3 | −92.27 |
| 3 | 5 | −49.32 |
| 4 | 7 | 48.37 |
| 5 | 9 | 101.47 |
| 6 | 11 | −59.18 |
| 7 | 12 | 42.78 |
| 8 | 15 | −66.36 |
| 9 | 16 | 30.81 |
| 10 | 18 | 35.09 |
| 11 | 19 | −22.51 |
| 12 | 22 | 39.91 |
| 13 | 24 | 39.25 |
| 14 | 25 | −26.20 |

| | | |
|---|---|---|
| 15 | 27 | −114.04 |
| 16 | 29 | 126.46 |

(Numerical Data 5)

Surface data

| Surface number | r | d | nd | νd | Effective diameter |
|---|---|---|---|---|---|
| 1* | 3,000.000 | 2.85 | 1.58313 | 59.4 | 61.51 |
| 2* | 17.203 | 12.67 | | | 40.39 |
| 3* | 5,528.803 | 2.25 | 1.85400 | 40.4 | 38.64 |
| 4* | 71.932 | 6.04 | | | 32.69 |
| 5 | −56.210 | 1.20 | 1.59522 | 67.7 | 32.30 |
| 6 | 63.894 | 0.15 | | | 31.59 |
| 7 | 44.388 | 6.72 | 1.85478 | 24.8 | 31.69 |
| 8 | −318.556 | (Variable) | | | 30.68 |
| 9 | 63.590 | 2.21 | 1.80518 | 25.4 | 22.43 |
| 10 | 314.826 | 0.15 | | | 22.56 |
| 11 | 45.943 | 1.00 | 1.89286 | 20.4 | 22.87 |
| 12 | 23.359 | 5.00 | 1.54072 | 47.2 | 22.56 |
| 13 | −455.410 | (Variable) | | | 22.74 |
| 14 (Stop) | ∞ | (Variable) | | | 24.01 |
| 15 | 29.639 | 1.20 | 2.00069 | 25.5 | 24.69 |
| 16 | 20.319 | 7.62 | 1.53775 | 74.7 | 23.77 |
| 17 | −81.736 | (Variable) | | | 23.49 |
| 18 | −64.883 | 4.17 | 1.95906 | 17.5 | 20.35 |
| 19 | −23.060 | 0.75 | 1.85026 | 32.3 | 21.21 |
| 20 | 180.484 | 3.27 | | | 22.40 |
| 21 | ∞ | (Variable) | | | 24.59 |
| 22 | 32.881 | 9.68 | 1.49700 | 81.6 | 31.59 |
| 23 | −43.472 | 0.15 | | | 31.74 |
| 24 | 45.776 | 8.66 | 1.49700 | 81.6 | 29.95 |
| 25 | −32.604 | 1.20 | 2.05090 | 26.9 | 28.72 |
| 26 | 152.153 | 4.38 | | | 28.57 |
| 27* | −82.580 | 2.10 | 1.85400 | 40.4 | 28.64 |
| 28* | −1,000.000 | 0.15 | | | 31.18 |
| 29 | 137.445 | 2.72 | 1.92286 | 20.9 | 33.48 |
| 30 | −877.955 | (Variable) | | | 34.00 |
| Image plane | ∞ | | | | |

Aspherical surface data

First surface

K = 0.00000e+000   A4 = 9.12334e−006   A6 = −1.42060e−008   A8 = 4.34729e−011
A10 = −8.74169e−014   A12 = 1.02679e−016   A14 = −6.43096e−020   A16 = 1.68912e−023

Second surface

K = −8.93367e−001   A4 = 3.79524e−008   A6 = −5.07064e−009   A8 = −1.14893e−010
A10 = 9.36196e−013   A12 = −2.65811e−015   A14 = 2.27870e−018

Third surface

K = 0.00000e+000   A4 = −1.02888e−005   A6 = −1.38723e−007   A8 = 1.18981e−009
A10 = −3.41414e−012   A12 = 3.80422e−015   A14 = 2.89821e−019   A16 = −2.70649e−021

Fourth surface

K = 0.00000e+000   A4 = 4.72216e−006   A6 = −1.41758e−007   A8 = 1.65340e−009
A10 = −6.55785e−012   A12 = 1.51299e−014   A14 = −1.52426e−017

Twenty-seventh surface

K = 0.00000e+000   A4 = −7.04435e−005   A6 = 2.07231e−007   A8 = −9.97067e−010
A10 = 4.95238e−012   A12 = −1.12135e−014   A14 = 9.39583e−018   A16 = −2.05544e−020

Twenty-eighth surface

K = 0.00000e+000   A4 = −5.05135e−005   A6 = 2.12633e−007   A8 = −6.02723e−010
A10 = 2.05246e−012   A12 = −3.41573e−015

Various data
Zoom ratio 2.02

| | Wide angle | Intermediate | Telephoto |
|---|---|---|---|
| Focal length | 14.42 | 23.00 | 29.10 |
| F-number | 2.92 | 2.92 | 2.92 |

-continued

| | | | |
|---|---|---|---|
| Half angle of view (degrees) | 56.32 | 43.25 | 36.63 |
| Image height | 21.64 | 21.64 | 21.64 |
| Total lens length | 157.53 | 145.54 | 143.01 |
| BF | 14.20 | 21.84 | 29.07 |
| d8 | 29.25 | 8.20 | 2.20 |
| d13 | 6.60 | 13.49 | 10.40 |
| d14 | 14.27 | 4.99 | 2.88 |
| d17 | 1.60 | 10.89 | 13.00 |
| d21 | 5.32 | −0.15 | −0.83 |
| d30 | 14.20 | 21.84 | 29.07 |

Lens unit data

| Unit | First surface | Focal length | Lens structure length | Front principal point position | Rear principal point position |
|---|---|---|---|---|---|
| 1 | 1 | −21.82 | 31.88 | 3.79 | −22.38 |
| 2 | 9 | 63.47 | 8.35 | 0.08 | −5.08 |
| 3 | 15 | 57.10 | 8.82 | 1.33 | −4.39 |
| 4 | 18 | −67.60 | 8.19 | 0.13 | −5.67 |
| 5 | 22 | 57.20 | 29.05 | −8.47 | −25.21 |

Single lens data

| Lens | First surface | Focal length |
|---|---|---|
| 1 | 1 | −29.68 |
| 2 | 3 | −85.36 |
| 3 | 5 | −50.05 |
| 4 | 7 | 45.97 |
| 5 | 9 | 98.58 |
| 6 | 11 | −54.36 |
| 7 | 12 | 41.24 |
| 8 | 15 | −69.01 |
| 9 | 16 | 31.07 |
| 10 | 18 | 35.57 |
| 11 | 19 | −24.01 |
| 12 | 22 | 39.32 |
| 13 | 24 | 39.77 |
| 14 | 25 | −25.47 |
| 15 | 27 | −105.51 |
| 16 | 29 | 128.94 |

(Numerical Data 6)

Surface data

| Surface number | r | d | nd | vd | Effective diameter |
|---|---|---|---|---|---|
| 1* | 3,000.000 | 2.50 | 1.58313 | 59.4 | 49.41 |
| 2* | 15.916 | 9.46 | | | 34.71 |
| 3* | −3,000.000 | 2.00 | 1.85400 | 40.4 | 33.54 |
| 4* | 101.368 | 5.42 | | | 29.88 |
| 5 | −49.454 | 1.22 | 1.59522 | 67.7 | 29.34 |
| 6 | 87.148 | 0.15 | | | 29.02 |
| 7 | 45.027 | 4.37 | 1.84666 | 23.9 | 29.14 |
| 8 | −800.000 | (Variable) | | | 28.67 |
| 9 | 76.213 | 2.78 | 1.85478 | 24.8 | 23.79 |
| 10 | −331.698 | 0.15 | | | 24.01 |
| 11 | 53.945 | 1.04 | 1.92286 | 20.9 | 24.34 |
| 12 | 23.773 | 4.93 | 1.53172 | 48.8 | 23.98 |
| 13 | 370.217 | (Variable) | | | 24.25 |
| 14 (Stop) | ∞ | (Variable) | | | 26.05 |
| 15 | 27.198 | 1.25 | 2.00069 | 25.5 | 27.46 |
| 16 | 19.466 | 8.88 | 1.53775 | 74.7 | 26.29 |
| 17 | −92.152 | (Variable) | | | 26.08 |
| 18 | −75.283 | 4.03 | 1.92286 | 20.9 | 22.50 |
| 19 | −22.118 | 0.97 | 1.83400 | 37.2 | 22.52 |
| 20 | 127.842 | 3.47 | | | 22.96 |
| 21 | ∞ | (Variable) | | | 25.12 |
| 22 | 29.190 | 11.06 | 1.49700 | 81.6 | 33.74 |
| 23 | −49.654 | 0.15 | | | 33.55 |

-continued

| | | | | | |
|---|---|---|---|---|---|
| 24 | 44.754 | 9.79 | 1.49700 | 81.6 | 30.70 |
| 25 | −29.008 | 1.23 | 2.05090 | 26.9 | 28.87 |
| 26 | 247.428 | 4.18 | | | 28.55 |
| 27* | −64.441 | 1.90 | 1.85400 | 40.4 | 28.55 |
| 28* | −504.930 | 0.15 | | | 30.73 |
| 29 | 214.873 | 3.10 | 1.92286 | 20.9 | 32.34 |
| 30 | −140.812 | (Variable) | | | 32.93 |
| Image plane | ∞ | | | | |

Aspherical surface data

First surface

K = 0.00000e+000  A4 = 8.27957e−006  A6 = −1.12868e−008  A8 = 3.62576e−011
A10 = −8.45964e−014  A12 = 1.31912e−016  A14 = −1.20674e−019  A16 = 4.82227e−023

Second surface

K = −9.06533e−001  A4 = −1.33767e−006  A6 = −2.39706e−008  A8 = −9.74300e−011
A10 = 6.82097e−013  A12 = −3.01059e−015  A14 = 4.00625e−018

Third surface

K = 0.00000e+000  A4 = −4.93182e−006  A6 = −1.33050e−007  A8 = 1.17384e−009
A10 = −3.87643e−012  A12 = 6.67554e−015  A14 = −6.57058e−018  A16 = 3.26457e−021

Fourth surface

K = 0.00000e+000  A4 = 9.66771e−006  A6 = −1.17661e−007  A8 = 1.60042e−009
A10 = −6.68028e−012  A12 = 1.72590e−014  A14 = −1.98480e−017

Twenty-seventh surface

K = 0.00000e+000  A4 = −8.04030e−005  A6 = 3.42699e−007  A8 = −1.25932e−009
A10 = 4.11715e−012  A12 = −7.36149e−015  A14 = 5.66865e−018  A16 = −1.93150e−020

Twenty-eighth surface

K = 0.00000e+000  A4 = −5.80671e−005  A6 = 3.47389e−007  A8 = −1.09234e−009
A10 = 2.84356e−012  A12 = −3.85208e−015

Various data
Zoom ratio 2.06

| | Wide angle | Intermediate | Telephoto |
|---|---|---|---|
| Focal length | 16.48 | 25.00 | 33.95 |
| F-number | 2.91 | 2.91 | 2.91 |
| Half angle of view (degrees) | 52.70 | 40.87 | 32.51 |
| Image height | 21.64 | 21.64 | 21.64 |
| Total lens length | 155.86 | 144.55 | 142.93 |
| BF | 18.00 | 26.39 | 35.65 |
| d8 | 21.23 | 6.87 | 1.81 |
| d13 | 7.91 | 9.54 | 7.22 |
| d14 | 16.57 | 6.92 | 1.79 |
| d17 | 1.60 | 9.27 | 13.32 |
| d21 | 6.38 | 1.39 | −1.05 |
| d30 | 18.00 | 26.39 | 35.65 |

Lens unit data

| Unit | First surface | Focal length | Lens structure length | Front principal point position | Rear principal point position |
|---|---|---|---|---|---|
| 1 | 1 | −21.84 | 25.12 | 2.80 | −17.99 |
| 2 | 9 | 74.93 | 8.90 | −0.86 | −6.19 |
| 3 | 15 | 53.19 | 10.13 | 1.22 | −5.39 |
| 4 | 18 | −67.31 | 8.47 | 0.58 | −5.49 |
| 5 | 22 | 50.41 | 31.56 | −6.51 | −25.41 |

Single lens data

| Lens | First surface | Focal length |
|---|---|---|
| 1 | 1 | −27.45 |
| 2 | 3 | −114.78 |
| 3 | 5 | −52.83 |
| 4 | 7 | 50.47 |
| 5 | 9 | 72.73 |
| 6 | 11 | −46.83 |
| 7 | 12 | 47.54 |

-continued

| | | |
|---|---|---|
| 8 | 15 | −74.45 |
| 9 | 16 | 30.74 |
| 10 | 18 | 32.75 |
| 11 | 19 | −22.54 |
| 12 | 22 | 38.80 |
| 13 | 24 | 37.05 |
| 14 | 25 | −24.65 |
| 15 | 27 | −86.67 |
| 16 | 29 | 92.56 |

(Numerical Data 7)

Surface data

| Surface number | r | d | nd | νd | Effective diameter |
|---|---|---|---|---|---|
| 1* | 3,000.000 | 2.50 | 1.58313 | 59.4 | 54.02 |
| 2* | 17.002 | 10.55 | | | 37.95 |
| 3* | −3,000.000 | 2.00 | 1.85400 | 40.4 | 36.72 |
| 4* | 103.357 | 5.92 | | | 32.55 |
| 5 | −53.771 | 1.20 | 1.59522 | 67.7 | 32.25 |
| 6 | 71.813 | 0.15 | | | 32.35 |
| 7 | 44.932 | 5.27 | 1.84666 | 23.9 | 32.80 |
| 8 | −800.000 | (Variable) | | | 32.41 |
| 9 | 79.977 | 2.58 | 1.88300 | 40.8 | 23.93 |
| 10 | −272.703 | (Variable) | | | 24.11 |
| 11 | 52.267 | 1.00 | 1.85896 | 22.7 | 25.24 |
| 12 | 21.846 | 5.57 | 1.53172 | 48.8 | 24.77 |
| 13 | 469.847 | (Variable) | | | 24.99 |
| 14 (Stop) | ∞ | (Variable) | | | 26.42 |
| 15 | 27.673 | 1.25 | 2.00069 | 25.5 | 27.33 |
| 16 | 20.610 | 8.99 | 1.51728 | 69.6 | 26.27 |
| 17 | −69.015 | (Variable) | | | 25.96 |
| 18 | −85.413 | 3.95 | 1.92286 | 20.9 | 21.44 |
| 19 | −23.170 | 0.97 | 1.85150 | 40.8 | 21.31 |
| 20 | 102.176 | 6.09 | | | 20.87 |
| 21 | ∞ | (Variable) | | | 24.25 |
| 22 | 30.453 | 10.01 | 1.49700 | 81.6 | 32.81 |
| 23 | −53.150 | 0.15 | | | 32.75 |
| 24 | 43.938 | 10.52 | 1.49700 | 81.6 | 30.68 |
| 25 | −26.899 | 1.20 | 2.05090 | 26.9 | 28.93 |
| 26 | 253.382 | 4.87 | | | 29.06 |
| 27* | −60.453 | 1.90 | 1.85400 | 40.4 | 29.22 |
| 28* | 422.431 | 0.15 | | | 32.29 |
| 29 | 173.827 | 3.57 | 1.92286 | 20.9 | 34.07 |
| 30 | −128.113 | (Variable) | | | 34.74 |
| Image plane | ∞ | | | | |

Aspherical surface data

First surface

K = 0.00000e+000   A4 = 7.61718e−006   A6 = −8.84394e−009   A8 = 2.88322e−011
A10 = −8.32552e−014   A12 = 1.42883e−016   A14 = −1.27136e−019   A16 = 4.88007e−023

Second surface

K = −8.55776e−001   A4 = −1.88772e−006   A6 = −1.88484e−008   A8 = −5.47491e−011
A10 = 5.77353e−013   A12 = −3.51848e−015   A14 = 5.67714e−018

Third surface

K = 0.00000e+000   A4 = −8.79443e−006   A6 = −1.25224e−007   A8 = 1.18780e−009
A10 = −4.01630e−012   A12 = 6.66396e−015   A14 = −5.30699e−018   A16 = 1.49876e−021

Fourth surface

K = 0.00000e+000   A4 = 4.40590e−006   A6 = −1.05557e−007   A8 = 1.45397e−009
A10 = −5.90232e−012   A12 = 1.48245e−014   A14 = −1.75690e−017

Twenty-seventh surface

K = 0.00000e+000   A4 = −7.88452e−005   A6 = 3.78977e−007   A8 = −1.39402e−009
A10 = 4.18891e−012   A12 = −8.96741e−015   A14 = 1.70441e−017   A16 = −4.71517e−020

Twenty-eighth surface

K = 0.00000e+000   A4 = −5.85438e−005   A6 = 3.70343e−007   A8 = −1.24198e−009
A10 = 2.92019e−012   A12 = −3.79238e−015

-continued

| Various data Zoom ratio 1.94 | | | |
|---|---|---|---|
| | Wide angle | Intermediate | Telephoto |
| Focal length | 17.50 | 24.00 | 33.95 |
| F-number | 2.91 | 2.91 | 2.91 |
| Half angle of view (degrees) | 51.03 | 42.03 | 32.51 |
| Image height | 21.64 | 21.64 | 21.64 |
| Total lens length | 160.64 | 149.03 | 145.23 |
| BF | 13.02 | 18.95 | 28.46 |
| d8 | 23.15 | 9.97 | 1.50 |
| d10 | 8.29 | 6.97 | 5.20 |
| d13 | 3.01 | 10.37 | 6.94 |
| d14 | 14.08 | 1.49 | 0.70 |
| d17 | 1.60 | 6.83 | 11.83 |
| d21 | 7.15 | 4.10 | 0.24 |
| d30 | 13.02 | 18.95 | 28.46 |

| Lens unit data | | | | | |
|---|---|---|---|---|---|
| Unit | First surface | Focal length | Lens structure length | Front principal point position | Rear principal point position |
| 1 | 1 | −22.64 | 27.58 | 3.18 | −19.49 |
| 2 | 9 | 70.28 | 2.58 | 0.31 | −1.06 |
| 3 | 11 | 2,120.55 | 6.57 | −27.18 | −30.99 |
| 4 | 15 | 50.07 | 10.24 | 1.76 | −5.06 |
| 5 | 18 | −61.70 | 11.01 | 0.93 | −7.71 |
| 6 | 22 | 60.43 | 32.37 | −12.97 | −30.08 |

| Single lens data | | |
|---|---|---|
| Lens | First surface | Focal length |
| 1 | 1 | −29.33 |
| 2 | 3 | −116.96 |
| 3 | 5 | −51.47 |
| 4 | 7 | 50.39 |
| 5 | 9 | 70.28 |
| 6 | 11 | −44.37 |
| 7 | 12 | 42.90 |
| 8 | 15 | −88.53 |
| 9 | 16 | 31.77 |
| 10 | 18 | 33.43 |
| 11 | 19 | −22.10 |
| 12 | 22 | 40.57 |
| 13 | 24 | 35.31 |
| 14 | 25 | −23.09 |
| 15 | 27 | −61.81 |
| 16 | 29 | 80.38 |

TABLE 1

| Conditional Expression | | Embodiment 1 | Embodiment 2 | Embodiment 3 | Embodiment 4 | Embodiment 5 | Embodiment 6 | Embodiment 7 |
|---|---|---|---|---|---|---|---|---|
| 1 | BFw/|f1| | 0.644 | 0.620 | 0.695 | 0.655 | 0.651 | 0.824 | 0.574 |
| 2 | f_BR/ft | 1.517 | 1.556 | 1.528 | 1.523 | 1.966 | 1.485 | 1.780 |
| 3 | vd_LA | 81.6 | 94.7 | 81.6 | 81.6 | 81.6 | 81.6 | 81.6 |
| 4 | vd_LB | 81.6 | 74.7 | 81.6 | 81.6 | 81.6 | 81.6 | 81.6 |
| 5 | f_LA/ft | 1.178 | 1.290 | 1.170 | 1.176 | 1.351 | 1.143 | 1.195 |
| 6 | |f_LC|/ft | 0.642 | 0.601 | 0.720 | 0.772 | 0.875 | 0.726 | 0.680 |
| 7 | Nd_BRN | 1.952 | 1.952 | 1.952 | 1.952 | 1.952 | 1.952 | 1.952 |
| 8 | ω | 54.47 | 54.47 | 52.70 | 56.32 | 56.32 | 52.70 | 51.03 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-188857, filed Oct. 4, 2018, which is hereby incorporated by reference herein in its entirety.

What is claimed is:

1. A zoom lens comprising, in order from an object side to an image side:

a first lens unit having a negative refractive power;
a second lens unit having a positive refractive power; and
a rear lens group including at least two lens units,
   at least the first lens unit and the second lens unit being configured to move for zooming to change an interval between each pair of adjacent lens units,
   the first lens unit including, in order from the object side to the image side, a first negative lens, a second negative lens, and a third negative lens,
   at least one of a lens surface on the object side or a lens surface on the image side of the first negative lens having an aspherical shape,
   wherein conditional expressions $$0.20 < BFw/|f1| < 1.00, \text{ and}$$

$$0.50 < f\_BR/ft < 2.00$$

are satisfied where f1 represents a focal length of the first lens unit, f_BR represents a focal length of a lens unit BR arranged closest to the image side in the rear lens group, ft represents a focal length of the zoom lens at a telephoto end, and BFw represents a back focus of the zoom lens at a wide angle end.

2. The zoom lens according to claim 1,
   wherein the lens unit BR includes a first positive lens arranged closest to the object side, and
   wherein a conditional expression $$vd\_LA > 70$$

is satisfied where vd_LA represents an Abbe number of a material of the first positive lens.

3. The zoom lens according to claim 2,
   wherein the lens unit BR includes a second positive lens arranged adjacent to, and on the image side of, the first positive lens, and
   wherein a conditional expression $$vd\_LB > 70$$

is satisfied where vd_LB represents an Abbe number of a material of the second positive lens.

4. The zoom lens according to claim 3, wherein the lens unit BR includes a fourth negative lens arranged adjacent to, and on the image side of, the second positive lens.

5. The zoom lens according to claim 2, wherein a conditional expression $$0.5 < f\_LA/ft < 1.8$$

is satisfied where f_LA represents a focal length of the first positive lens.

6. The zoom lens according to claim 4, wherein a conditional expression $$|f\_LC|/ft < 1.0$$

is satisfied where f_LC represents a focal length of the fourth negative lens.

7. The zoom lens according to claim 4, wherein the lens unit BR includes a fifth negative lens adjacent to, and on the image side of, the fourth negative lens, the fifth negative lens having a lens surface having an aspherical shape.

8. The zoom lens according to claim 7, wherein a biconvex air lens is formed between the fourth negative lens and the fifth negative lens.

9. The zoom lens according to claim 1,
   wherein the lens unit BR includes a plurality of negative lenses, and
   wherein a conditional expression $$Nd\_BRN > 1.90$$

is satisfied where Nd_BRN represents an average value of refractive indices of materials of the plurality of negative lenses included in the lens unit BR.

10. The zoom lens according to claim 1, wherein at least one of a lens surface on the object side or a lens surface on the image side of the second negative lens has an aspherical shape.

11. The zoom lens according to claim 1, wherein the first negative lens has a lens surface having an aspherical shape in which a positive refractive power is increased from an optical axis to a periphery.

12. The zoom lens according to claim 1, wherein at least a part of the second lens unit is configured to move from the object side toward the image side for focusing from infinity to proximity.

13. The zoom lens according to claim 1, wherein the rear lens group consists of, in order from the object side to the image side:
   a third lens unit having a positive refractive power;
   a fourth lens unit having a negative refractive power; and
   a fifth lens unit having a positive refractive power.

14. The zoom lens according to claim 1, wherein the rear lens group consists of, in order from the object side to the image side:
   a third lens unit having a negative refractive power; and
   a fourth lens unit having a positive refractive power.

15. The zoom lens according to claim 1, wherein the rear lens group consists of, in order from the object side to the image side:
   a third lens unit having a positive refractive power;
   a fourth lens unit having a positive refractive power;
   a fifth lens unit having a negative refractive power; and
   a sixth lens unit having a positive refractive power.

16. An image pickup apparatus comprising:
   a zoom lens; and
   an image pickup element configured to receive an image formed by the zoom lens,
      the zoom lens including, in order from an object side to an image side:
         a first lens unit having a negative refractive power;
         a second lens unit having a positive refractive power; and
         a rear lens group including at least two lens units,
      at least the first lens unit and the second lens unit are configured to move for zooming to change an interval between each pair of adjacent lens units,
      the first lens unit including, in order from the object side to the image side, a first negative lens, a second negative lens, and a third negative lens,
      at least one of a lens surface on the object side or a lens surface on the image side of the first negative lens having an aspherical shape,
   wherein conditional expressions $$0.20 < BFw/|f1| < 1.00; \text{ and}$$

$$0.50 < f\_BR/ft < 2.00,$$

are satisfied where f1 represents a focal length of the first lens unit, f_BR represents a focal length of a lens unit BR arranged closest to the image side in the rear lens group, ft represents a focal length of the zoom lens at a telephoto end, and BFw represents a back focus of the zoom lens at a wide angle end.

17. The image pickup apparatus according to claim 16, wherein a conditional expression $$\omega > 50°,$$

is satisfied where w represents an image pickup half angle of view at the wide angle end.

* * * * *